United States Patent [19]
Powell et al.

[11] Patent Number: 5,650,943
[45] Date of Patent: Jul. 22, 1997

[54] APPARATUS AND METHOD FOR TESTING FOR VALVE LEAKS BY DIFFERENTIAL SIGNATURE METHOD

[75] Inventors: Lloyd E. Powell, Severna Park; Joseph G. Dimmick, Odenton, both of Md.

[73] Assignee: Leak Detection Services, Inc., Annapolis, Md.

[21] Appl. No.: 419,538

[22] Filed: Apr. 10, 1995

[51] Int. Cl.$^6$ ............................................. G01M 3/24
[52] U.S. Cl. ..................... 364/550; 73/40; 73/40.5 R; 73/40.5 A; 73/592; 364/551.01
[58] Field of Search ..................... 73/40, 40.5 R, 73/40.5 A, 587, 592; 364/188, 550, 551.01

[56] References Cited

U.S. PATENT DOCUMENTS

| | | | |
|---|---|---|---|
| 4,083,229 | 4/1978 | Anway | 73/40.5 A |
| 4,201,092 | 5/1980 | Dau | 73/40.5 A |
| 4,785,659 | 11/1988 | Rose et al. | 73/587 X |
| 5,058,419 | 10/1991 | Nordstrom et al. | 73/40.5 A |
| 5,101,774 | 4/1992 | Marziale et al. | 73/40.5 A X |
| 5,117,676 | 6/1992 | Chang | 73/40.5 A |
| 5,136,876 | 8/1992 | Taylor | 73/40.5 A |
| 5,205,173 | 4/1993 | Allen | 73/592 |
| 5,341,670 | 8/1994 | Brook et al. | 73/40.5 A |
| 5,349,568 | 9/1994 | Kupperman et al. | 73/40.5 A X |
| 5,361,636 | 11/1994 | Farstad et al. | 73/592 |
| 5,416,724 | 5/1995 | Savic | 73/40.5 A X |
| 5,557,969 | 9/1996 | Jordan | 73/592 |

OTHER PUBLICATIONS

Dimmick et al, "Ultrasonic leak detection cuts valve maintenance costs", Power Engineering, (no page designation). Aug. 1986.

Acoustic Valve Leak Analyzer, Test Engineer's Guide, Leak Detection Services, Inc. (1989), Fifth Edition.

Acoustic Valve Leak Analyzer, Operator's Manual, Leak Detection Services, Inc., (1989), Fifth Edition.

*Primary Examiner*—Edward R. Cosimano

[57] ABSTRACT

A portable computing device is used for acoustic testing of valve systems for valve leaks. Transducers are applied to appropriate locations in the valve system to obtain sound signals, which are fast Fourier transformed into valve signatures. Multiple signatures are displayed simultaneously and are compared automatically by the system to derive a recommended result and manually to make determinations of valve leaks by the differential signature method or the like. The signatures and the user's determinations are stored on a hard drive. Various panels are displayed to give the user step-by-step instructions for performing the test. The results can be reported to the client's office computers.

65 Claims, 33 Drawing Sheets

FIG. 2

SIGNATURE DONE
ITEM 1.0
| OK |

FIG. 3

SAVE CHANGES?
| YES | NO |

FIG. 4

| 1 | L 2 | L2 3 | T 4 | T2 5 | NA 6 | NT 7 |

FIG. 5

© 1994 LDS  UNIT LAB2    QUIT

AVLA CONTROL PANEL

| *RQ* ITEM 1 | PLAN 20 | XERIES 0 |

ENTER NEW ITEM ( 6 ):   ESC  ←  RET  00

| 1 | 2 | 3 | 4 | 5 | 6 | 7 | 8 | 9 | 0 |

AVERAG 2

SERIES 0

LIST    ITEM 1    PLAN20

|   | 1 | 2 | 3 | 4 |
|---|---|---|---|---|
| .0 | X | X | *Xd | X |
| .1 | *T | 0 | */T/ | 0 |
| .2 | 0 | X | X | 0 |
| .3 | 0 | X | X | 0 |
| .4 | 0 | 0 | 0 | 0 |

TRAP BYPASS-AS BEFORE FV 35
TRAP AS BEFORE FV 35
UP BLOCK
DN BLOCK
ORIFICE

| LIST | MAKE | SIGNATURES | REVIEW |

FIG. 8

| ITEM | SYS VALVE | TP | NOMENCLATURE | P | DWG | C | D | B | B | ELEV | ROW |
|---|---|---|---|---|---|---|---|---|---|---|---|
| 54 | LV 17 | IA | HTR 5A DUMP | I | 739 | C | 6 | | | 506 | B |
| UNIT LAB 2 SEARCH DEFINE | | | | | | | | | | 490 0- | |
| 17.0 | LV 33 | IA | CONDENSATE REJECT | I | 737 | B | 4 | | | 480 | A |
| 17.1 | 6081 | IA | UP BLOCK | | 737 | B | 6 | L | | 480 | |
| 17.2 | 6082 | IA | DN BLOCK | | 737 | B | 6 | L | | 480 | |
| 21 | 6052 | D | HOTWELL PUMP A VENT | I | 737 | E | I | | | 481 | |
| 22 | 6001 | D | HOTWELL PMP B VENT | I | 737 | E | I | | | 481 | |
| 23 | 6060 | D | HOTWELL PMP C VENT | I | 737 | B | I | | | 481 | |
| 69.2 | | 23 | TRAP UP BLOCK | | 535 | G | 2 | S | | 481 | |
| 69.3 | | 23 | TRAP DN BLOCK | | 535 | G | 2 | S | | 481 | |
| 69.4 | | 23 | UP BLOCK | | 535 | G | | F | | 481 | |
| 69.5 | | 23 | DN BLOCK | | 535 | G | | F | | 481 | |
| 35 | 'AS | 23 | TRAP BYPASS-AS AFTER FV 35 | I | 535 | C | | | S | 481 | B |
| 35.1 | 'AS S/T 509 | 23 | TRAP-AS AFTER FV-35 | I | 535 | C | | | | 481 | |
| 35.2 | 'AS | 23 | TRAP UP BLOCK | | 535 | C | | S | | 481 | |
| 35.3 | 'AS | 23 | TRAP DN BLOCK | | 535 | C | | S | | 481 | |
| 69 | ' FV 175A | 23 | LP BELOW SEAT DRN TRP BYP | I | 535 | G | 2 | | S | 481 | B |
| 69.1 | ' ST 501A | 23 | LP BELW SEAT DRN IP EXT BFT 2A | I | 535 | G | 2 | | | 481 | |
| 70 | ' FV 175B | 23 | LP BELW SEAT DRN TRP BYP | I | 535 | G | 2 | | S | 481 | B |
| 70.1 | ' ST 501B | 23 | LP BELW SEAT DRN IP EXT BFT 2B | | 535 | G | 2 | | | 481 | |
| 70.2 | ' | 23 | TRAP UP BLOCK | | 535 | G | 2 | S | | 481 | |
| 70.3 | ' | 23 | TRAP UP BLOCK | | 535 | G | 2 | S | | 481 | |
| 70.4 | ' | 23 | UP BLOCK | | 535 | G | | F | | 481 | |
| 70.5 | ' | 23 | DN BLOCK | | 535 | G | | F | | 481 | |

| HIDE | DEFINE | SEARCH | PgUp | PgDn | TEST - IT | ESC |
|---|---|---|---|---|---|---|

FIG. 11

| | | | |
|---|---|---|---|
| 1 5/9/94 | 42 5/9/94 | 76 5/10/94 | 112 5/11/94 |
| 2 5/11/94 | 43 5/9/94 | 77 5/10/94 | 113 5/11/94 |
| 3 5/9/94 | 44 5/9/94 | 78 5/10/94 | 114 5/11/94 |
| 4 5/9/94 | 46 5/13/94 | 79 5/10/94 | 115 5/11/94 |
| 5 5/10/94 | 47 5/13/94 | 80 | 124 5/12/94 |
| 6 5/9/94 | 48 5/13/94 | 82 | 125 5/12/94 |
| 7 5/10/94 | 49 5/13/94 | 84 5/11/94 | 126 5/12/94 |
| 8 5/10/94 | 50 5/13/94 | 86 5/11/94 | 127 |
| 9 5/10/94 | 51 5/13/94 | 88 5/12/94 | 129 5/12/94 |
| 10 5/10/94 | 52 5/13/94 | 89 5/12/91 | 130 5/12/94 |
| 11 5/9/94 | 53 5/13/94 | 90 5/12/91 | 131 5/12/94 |
| 12 5/9/94 | 54 5/13/94 | 91 5/12/94 | 132 5/12/94 |
| 15 5/18/94 | 55 5/11/94 | 92 5/12/94 | 133 5/12/94 |
| 18 5/13/94 | 56 5/13/94 | 93 5/12/94 | |
| 19 5/13/94 | 57 5/11/94 | 94 5/13/94 | |
| 24 5/9/94 | 58 5/13/94 | 95 5/9/94 | |
| 27 5/9/94 | 59 5/13/94 | 96 5/9/94 | |
| 28 5/10/94 | 60 5/13/94 | 100 5/9/94 | |
| 30 5/11/94 | 63 5/12/94 | 101 5/9/94 | |
| 32 5/12/94 | 67 5/13/94 | 102 5/9/94 | |
| 34 5/11/94 | 68 5/13/94 | 103 5/9/94 | |
| 35 5/9/94 | 69 5/9/94 | 104 5/12/94 | |
| 36 5/9/94 | 70 5/10/94 | 105 5/11/94 | |
| 37 | 71 5/9/94 | 107 5/11/94 | |
| 39 5/9/94 | 74 5/10/94 | 108 5/11/94 | |
| 40 5/13/94 | 75 5/10/94 | 109 5/11/94 | |

| REVIEW ITEM | LIST ALL | OUTPUT | ZIP | ESC |

FIG. 12

```
©1994 LDS        SYS:            VALVE: LV 17
TP: IA           NOMENCLATURE: HTR 5A DUMP              RQ:
PRI: 1              DWG: 739        COORD: C-3
DIAMETER: 6         BLOCKS:         BYPASSES:
ELEV: 506           ROW: B          COL: 11    DATE: 7 / 05 / 1990

1200
    SER  DATE       TIME       RESULT  C   NOTE

[0]  5/13/94    16:59:53    L MED      SPKY

EXTERNAL LEAK:  [STEM]         BONNET         FLANGE
    VALVE:          STUCK          TAGGED OUT     MISSING
    ACTUATOR:       DAMAGED        LOOSE          STICKING
                    NEEDS ADJUSTING MISSING       STUCK
    HAND WHEEL:     BROKEN         MISSING        LOOSE
    VALVE ID:       NONE           [WRONG]        OFF P&ID
                    DAMAGED

[ CONCLUDE ]  [△]   ITEM 23.0   [▽]   [ SER ]   [ ESC ]
```

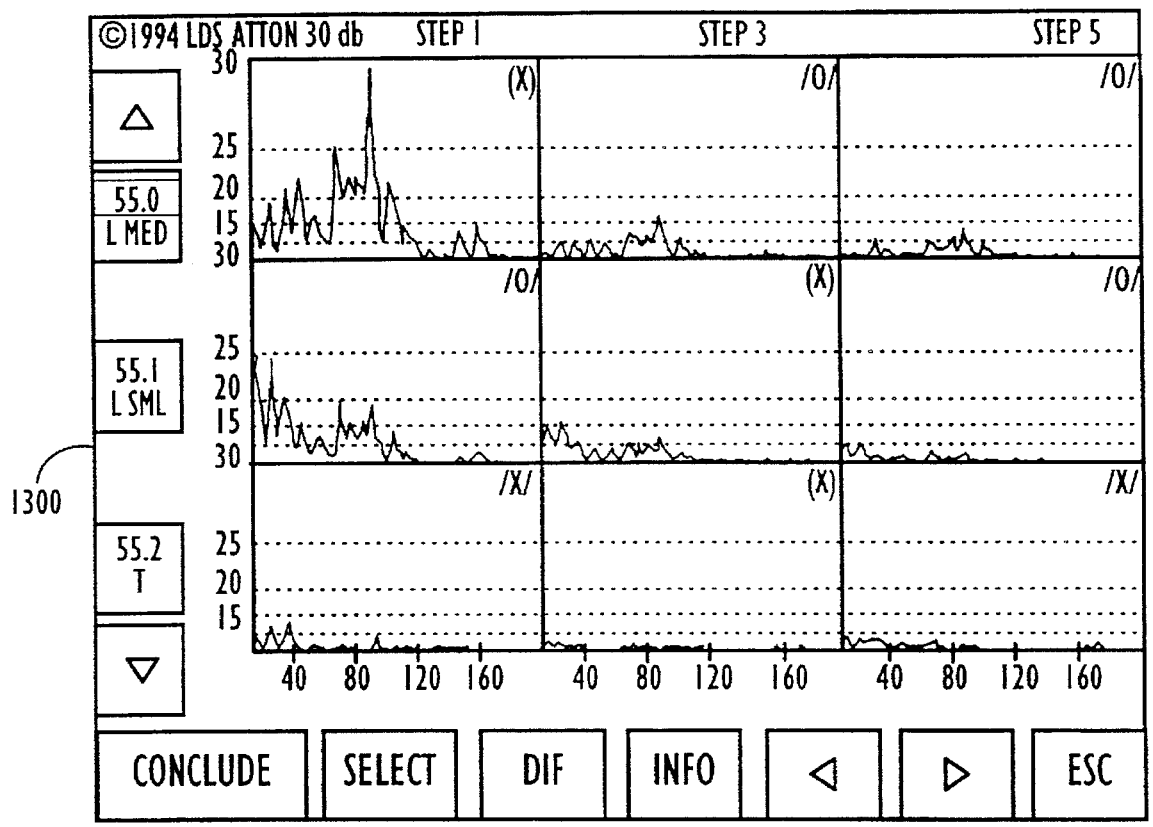

APPARATUS AND METHOD FOR TESTING FOR VALVE LEAKS BY DIFFERENTIAL SIGNATURE METHOD

FIELD OF THE INVENTION

This invention relates to acoustic detection of leaks in valves carrying fluid and more particularly to an apparatus and method for applying hardware and software to automate the process of acoustic detection of leaks in such valves.

DESCRIPTION OF THE PRIOR ART

Systems for carrying gases or liquids typically contain numerous valves which are subject to developing leaks. One method of detecting leaks in valves of such systems, the differential signature method, is described in the following documents, which are hereby incorporated in their entireties by reference into this specification:

Dimmick et al, "Ultrasonic leak detection cuts valve maintenance costs," *Power Engineering*, August 1986;

AVLA™ *Acoustic Valve Leak Analyzer Operator's Manual*, ©1989 Leak Detection Services, Inc.; and AVLA™ *Acoustic Valve Leak Analyzer Test Engineer's Guide*, © 1989 Leak Detection Services, Inc.

The differential signature method works by measuring acoustic signatures defined as the amplitude of ultrasonic signals emanating from a test point as a function of frequency or of time for a given frequency. Typically, three acoustic signatures of amplitude as a function of frequency are taken, one at the valve and two (called the background signatures) at positions on a pipe upstream and downstream from the valve. The background signatures are taken upstream and downstream of the valve to prevent errors due to inaccurate human measurements and omissions of vital data. The differences between the signature at the valve and the background signatures indicate the presence or absence of a leak and its specific severity. For a non-leaking valve, these differences should be small. The ratios of the signature at the valve and the upstream and downstream signatures in decibels at the dominant frequency, which is the frequency at which the amplitudes have peak values, indicate the severity of the leak. The hardware for this method has typically included a device for taking the acoustic signatures and plotting such signatures on graph paper with pens of different colors. The user has then had to manually determine the presence and severity of the leak on the basis of the plotted signatures.

The conventional method described above has the following disadvantages. First, it results in a massive amount of paper. Second, as the hardware performs no analysis of the data, and as neither the hardware nor the plots indicate the procedures for determining the presence and severity of a leak, the conventional method requires extensive training of the user, many manhours, and countless paper plots.

SUMMARY OF THE INVENTION

It is an object of the invention to provide an apparatus and method for automating the process of acoustic detection of leaks in valves carrying fluids.

It is a further object of the invention to provide such an apparatus and method while eliminating the need to print out hard copies of the acoustic signatures.

It is a further object of the invention to provide such an apparatus and method that require little training for proper use.

It is a further object of the invention to provide such an apparatus and method that offer the advantages of elimination of bulky paper records, faster data collection, faster and automated repeatability confirmation, easier data manipulation and analysis, integration of planning, recording, analyzing, reporting, and record-keeping, ease of upgrading and modification by simple software changes, ease of tailoring the system to a specific client's needs, and reduction of training and skill requirements for data collection.

It is a further object of the invention to provide such an apparatus and method that offer the advantages of digital collection, analysis and conclusion recording; a data collection unit and accessories including a software-controlled, hardware FFT module to convert transducer signals to spectra for electronic transmission to a computer; a data collection and in-plant analysis software module; the ability to use an office PC to develop and maintain databases of clients' valve systems; the ability to use a generic office PC to develop standardized test procedures, to permit more detailed comparison and analysis of the signatures, and to prepare reports with a minimum of human intervention to maintain historical records of individual valves in clients' plants; and to enable survey clients to view test data and conclusions, but not to change them.

It is a further object of the invention to provide a computer based valve signature recorder having a programmed function key interface which guides the user through the planning, testing and analysis of a valve leakage survey, to provide an accurate and organized apparatus for managing multi-series data on five hundred or more valves, and to provide a method of analyzing valves with such an apparatus, which method automatically handles many details of instrument operation which could frustrate the non-electronics-oriented operator.

To achieve these and other objects, the invention includes an apparatus comprising transducer means for receiving sounds from the valve system and for converting the sounds into electrical signals; transform means, such as fast Fourier transform means, for receiving the electrical signals, for transforming the electrical signals by a transform such as a fast Fourier transform to produce sound signatures, and for outputting digital data representing the sound signatures; means for comparing at least two of the sound signatures to derive a recommended result regarding the valve leaks; and digital storage means for storing the digital data representing the sound signatures and a conclusion or judgment derived from the data and the recommended result. The conclusion includes the user's judgment on whether there is a leak, the economic need for repair, and the quantitative severity of the leak if any. The invention also includes a method comprising the steps of attaching a plurality of transducers to the valve system; operating the plurality of transducers to receive sounds from the valve system and to convert the sounds into electrical signals; fast Fourier or otherwise transforming the electrical signals to produce sound signatures and outputting digital data representing the sound signatures; comparing at least two of the sound signatures to derive a recommended result regarding the valve leaks; and storing the digital data representing the sound signatures and the conclusion or judgment (as defined above) in a digital storage medium.

BRIEF DESCRIPTION OF THE DRAWINGS

The invention will now be described more fully with respect to the drawings, in which

FIG. 2 shows an OK window in the user interface of the apparatus according to the invention;

FIG. 3 shows a YES/NO window in the user interface of the apparatus according to the invention;

FIG. 4 shows a multiple-choice window in the user interface of the apparatus according to the invention;

FIG. 5 shows a numeric window in the user interface of the apparatus according to the invention;

FIG. 8 shows a LIST PANEL in the user interface of the apparatus according to the invention;

FIG. 11 shows a REVIEW PANEL in the user interface of the apparatus according to the invention;

FIG. 12 shows an INFO PANEL in the user interface of the apparatus according to the invention;

FIG. 13 shows an ANALYZE PANEL in the user interface of the apparatus according to the invention;

FIG. 14 shows a CONCLUDE PANEL in the user interface of the apparatus according to the invention;

DETAILED DESCRIPTION OF THE PREFERRED EMBODIMENT

Figure 1:
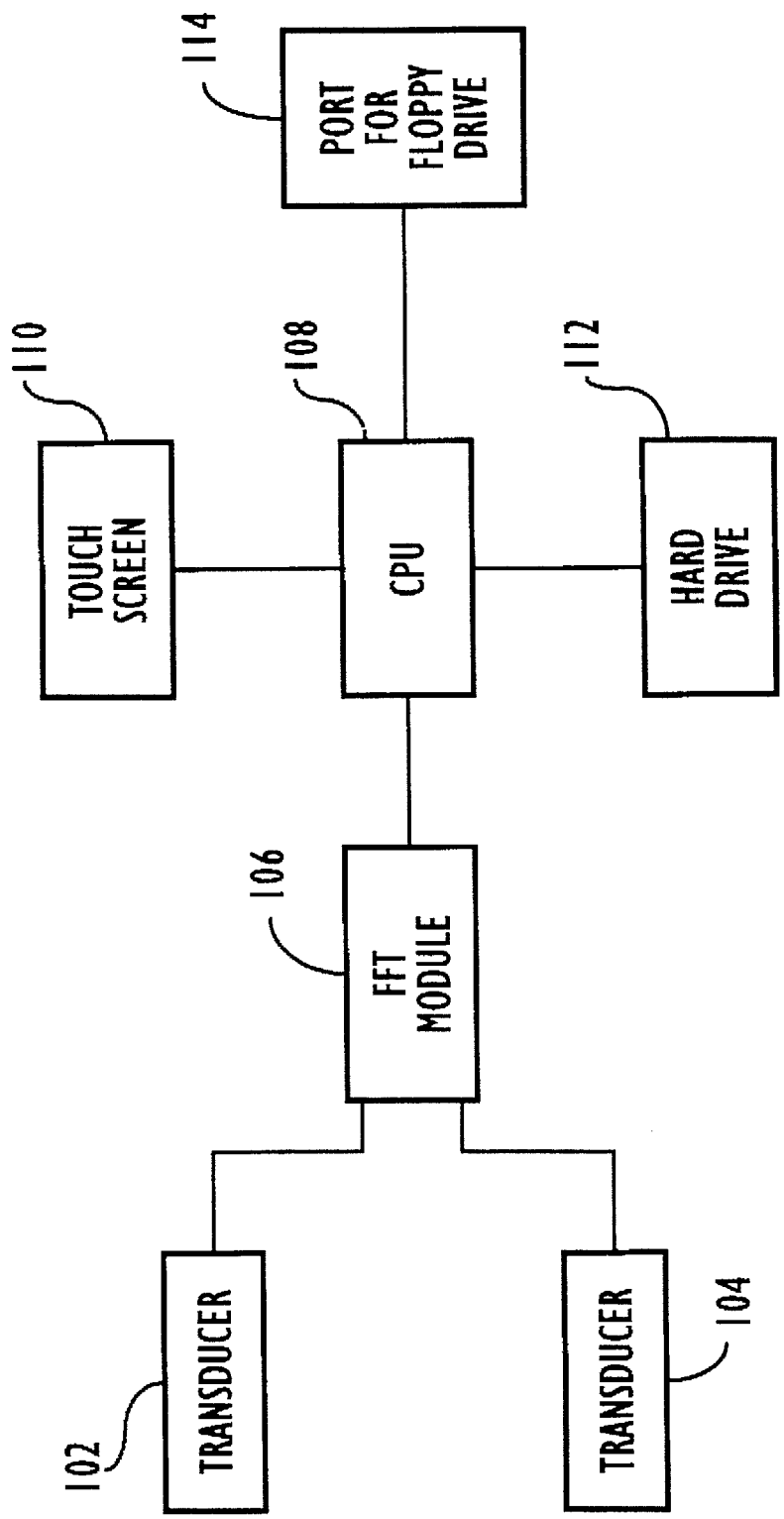
FIG. 1 shows a block diagram of the apparatus according to the invention.
Figure 6:
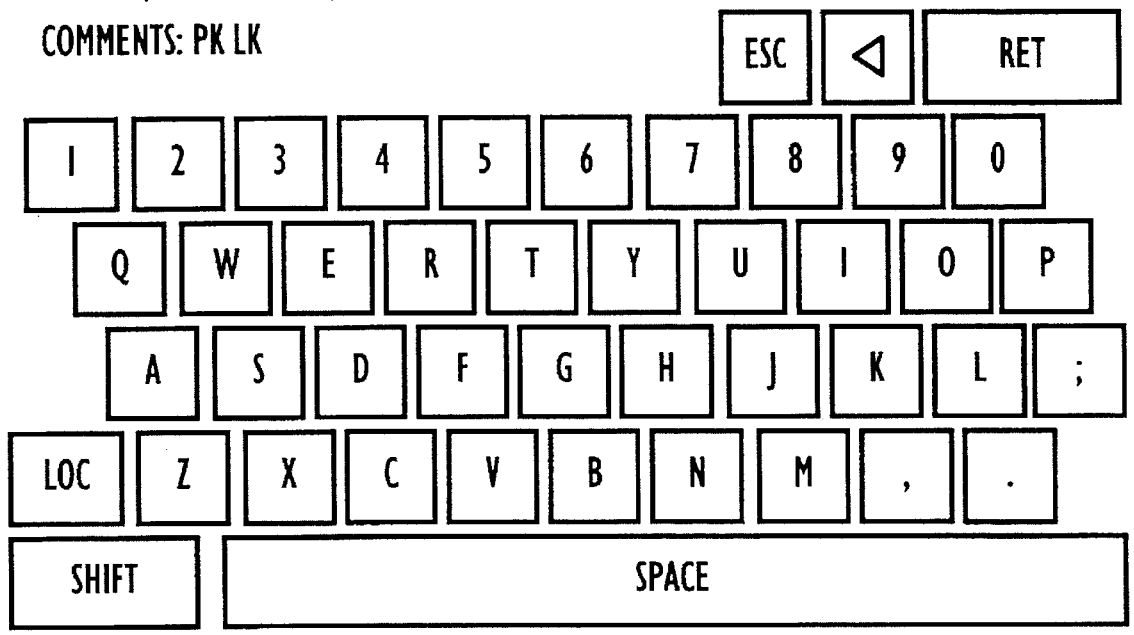
FIG. 6 shows an alphanumeric window in the user interface of the apparatus according to the invention.
Figure 7:
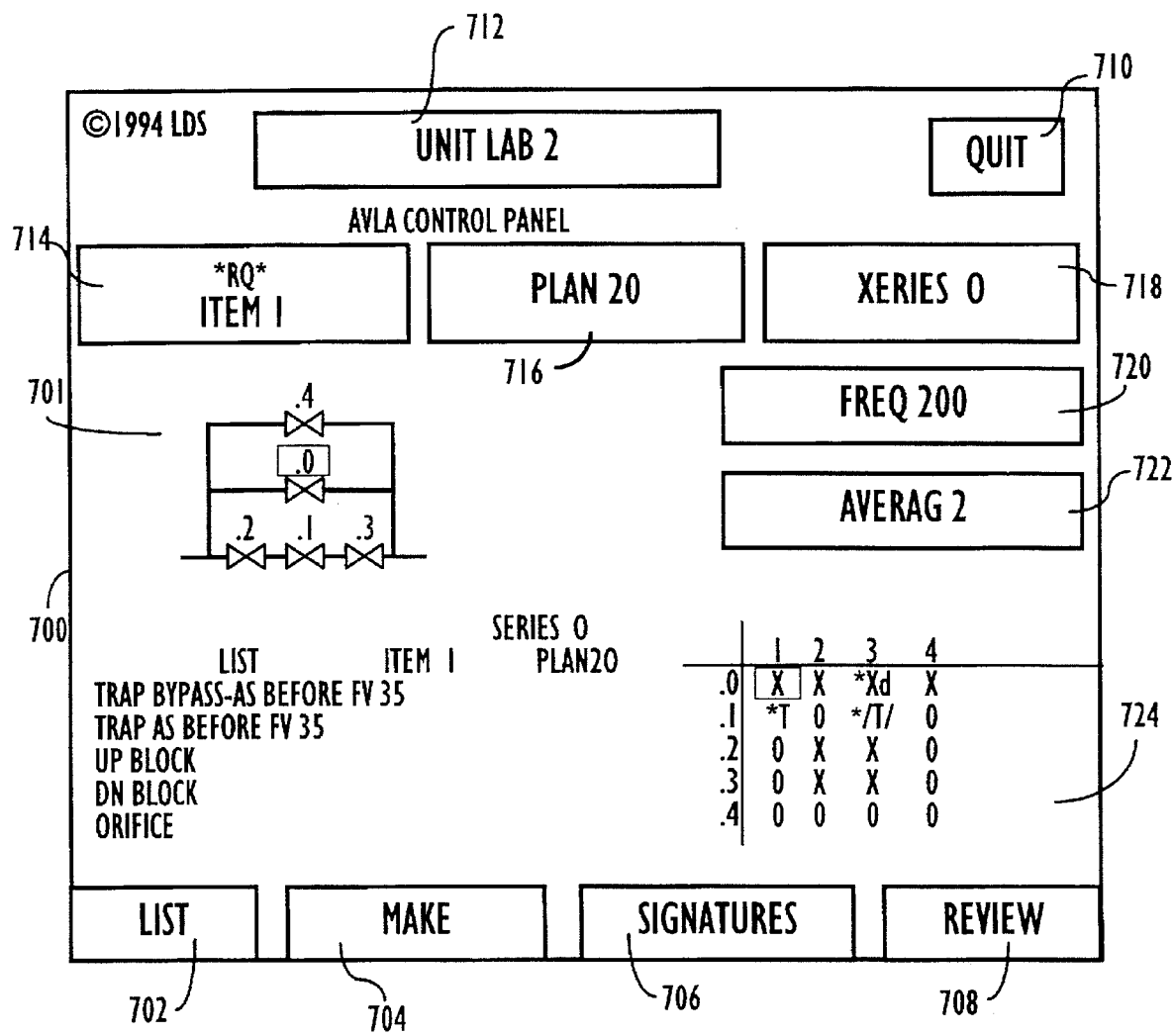
FIG. 7 shows a CONTROL PANEL in the user interface of the apparatus according to the invention.

A presently working system according to the invention will now be described with respect to the block diagram of FIG. 1. Apparatus 100 includes two transducers, channel A transducer 102 and channel B transducer 104, for taking sound readings from the valves. Signals from these two transducers go into, for example, fast Fourier transformer (FFT) module 106 or the like, where they are fast Fourier analyzed to yield acoustic signatures. CPU 108 controls storage of these sound signatures on hard drive or other storage device 112 and the display thereof, as well as receipt of user input, on touch screen or other user interface device 110. The apparatus can exchange data with other devices through port 114 for a floppy drive or the like. These components as provided in the presently working embodiment will be described in further detail below.

The presently working system takes the form of a portable, battery-operated laptop personal computer (PC) with data collection software, a hardware FFT module, spare batteries, transducers and other accessories, all packed in a rugged case for in-plant use. Separate, off-line battery chargers and a miniaturized printer can be provided.

The working system measures 12.5×10×2.5 inches and weighs 10 pounds. A 12 volt, 2.3 amp hour, lead acid gel cell battery with quick exchange access powers the apparatus. A small rocker on/off switch on the lower right-hand side of the system constitutes the only external control on the system.

The display is a 6×8 inch backlit liquid crystal display (LCD) with video graphics array (VGA) resolution (640× 480 dots). A transparent, pressure sensitive panel covers the full LCD. Moderate finger pressure registers a touch and release with its horizontal and vertical position. Thus, the touch of a certain function displayed on the LCD replaces a dedicated push-button on the system. Other constructed embodiments of the invention have included a conventional monitor and a mouse rather than a touch screen. Those skilled in the art who have reviewed this specification will understand which user interface devices are useful for which purposes.

Two BNC connectors on the upper right-hand side of the system provide Channel A and Channel B transducer inputs. The Channel A input, toward the top, is used for most applications. Standard 100 kohm input impedance amplifiers are optimized for use of the transducers on almost any valve signature. Automatic gain controls, invisible to the operator, replace the external attenuation or gain switch critical to other instruments.

The Channel A and Channel B transducer inputs go to the hardware FFT module 106. This module includes an integrated circuit for effecting the fast Fourier transform of the signals received through the transducer inputs under control of code stored in an EEPROM or the like.

The operating program and test data are stored on an internal 80 Mbyte hard drive.

Five connectors on the left hand side of the system allow the system to be used as a 386SX DOS-compatible computer. The serial port (COM1), external CRT, and keyboard connectors match most available peripherals. The floppy-disk connector is not standard, but is designed to be used with a 3½" drive powered by the internal battery. A backup drive unit may be used in place of the floppy-disk drive; such backup drive units are commercially available and will not be described in detail here.

The transducers are e.g. accelerometers specially selected for their response to acoustic emission signals in the 10–200 kHz frequency range. Commercially available matched pairs of two types of transducers are preferably used. When used with the differential signature method, the transducers should be used in the factory-matched pairs.

The preferred transducer is the most sensitive, especially at frequencies near 25 kHz, and can be used without a standoff at temperatures ranging from −100° F. to +350° F. It loses sensitivity if the cable length exceeds 3 meters. A second type of usable transducer is about 20 dB less sensitive and can be used to record signals that would overrange the apparatus if recorded with the preferred transducer. The second type of transducer has a temperature range which is −100° F. to +350° F. It is most sensitive at frequencies near or above 50 kHz and can be used at cable lengths up to 19 meters without loss of signal strength.

The choice of transducers depends on the situation encountered, but once chosen, the same transducers, cable, and standoff must be used throughout a test. Otherwise, the results of various measurements cannot be compared to determine whether a valve leaks.

The transducer standoff is an 8-inch long by ⅜-inch diameter steel rod with a ½-inch diameter ball end. The other end is threaded, allowing the transducer to be attached by the 10–32 mounting stud. The ball end mates with the spherical indentation in the disk. A small amount of coupling compound should be applied at the transducer-rod interface and the ball-disk interface to assure a good acoustical contact.

The transducer standoff may be used as a hand-held probing tool to move quickly from one valve location to another or as an insulator to keep the heat of a hot valve or pipe from damaging the transducer.

If acoustic measurements on steam valves and piping or other high-temperature structures are desired, the transducer standoff must be used to keep the transducer cool. The transducer must not be allowed to exceed its temperature limits, or it will become permanently damaged or destroyed. A small amount of coupling compound is required at all metal-to-metal interfaces. No excessive pressure is required if the surfaces are free of dirt and mated properly. The transducer end of the standoff should be held while the measurement is made.

The transducer cables are shielded, high-temperature coaxial cables with BNC connectors at one end and microdot connectors at the other end. Normally, one 15-ft cable is supplied with each transducer. Other lengths are available.

The software program resides on the root directory of the hard drive mentioned above. Thus, it can be upgraded as needed with no need to change a ROM chip or the like. The external floppy drive referred to above can be used for this purpose.

In order to develop a clear comprehension of the complex analyzer program, the building blocks will first be described, and then a step-by-step program operation will be described. In this description, the valves are grouped as a plant, a unit, an item, a sub-item, a plan or a series. The unit is the highest group and typically represents several days' work. An item is a particular assemblage of valves being tested and is designated by a whole number. Decimal numbers indicate sub-items (particular valves or the like). A plan is a test structure defined in terms of a previously prepared assemblage of valves or a modification of a previously prepared assemblage of valves; a plan may represent a single valve or several. Fewer than a hundred plans can be used to cover almost all actual situations. A series is a set of signatures for all valves in an item. In a plan, any assemblage of valves can be defined as a system (e.g., preheat system, main steam system, auxiliary steam system, or lube oil system). Parts of a system can be further defined as subsystems.

The display and touch screen form a flexible function-key interface for directing all operator-instrument interaction. Every function key is an independently named and located touch zone on the display screen. In most cases, each function key is identified by a word or symbol enclosed in a finger-sized rectangle. The exceptions are selection and display changes, which are located directly on a signature. Any time an activated function key is touched, the rectangle will be highlighted until the function key is released. If the finger pressure is removed while within that rectangle, the appropriate command or character is recognized by the program. Then, the display changes to reflect that selection. Typing the first character of any function key on the external keyboard will also produce the same response. A mouse or other pointing device could also be used to actuate the function keys, the working environment permitting.

Function keys can produce three types of responses on the display. Some trigger an action which results in a visible change to their own display. Others produce a pop-up window within the display requesting a single key, numeric or alphanumeric response. The third type actually changes the whole display to a new panel. This panel will have a different set of function keys on it.

Pop-up decision windows, as shown in FIGS. 2–6, are used whenever the program requires the operator to make an individual selection. There are five types of selection windows: the OK window of FIG. 2, the YES/NO window of FIG. 3, the multiple-choice window of FIG. 4, the numeric window of FIG. 5, and the alphanumeric window of FIG. 6. The OK window announces a particular situation and waits for the user to acknowledge it. The YES/NO window asks a particular question and waits for the user to press "YES" or "NO". The multiple-choice window presents a key for each of the allowed entries. After one of the entries is pressed, the window is removed. The numeric window asks the user to type in a number selection. Of the various keys available in this window, "<" removes a digit, "RET" sends the number to the program while removing the window, and "ESC" cancels any entry and removes the window. A default selection is shown in parentheses. The alphanumeric window requests a name or comment. Of the various keys available in this window, "<" removes a character, "RET" sends the character line to the program while removing the window, and "ESC" cancels any entry and removes the window. If the entry has already been started when this window appears, the previously entered part is displayed and can be extended or corrected.

To simplify organization and execution of a valve leakage survey, the program breaks down the task into manageable subtasks as much as possible. The instrument presents on the display only functions necessary to the task at hand. This task-related group of functions on the display is called a task panel. The various task panels will be described with respect to FIGS. 7–14, which show the panels themselves, and FIG. 15, which shows a tree structure for the use of the panels.

Figure 15:
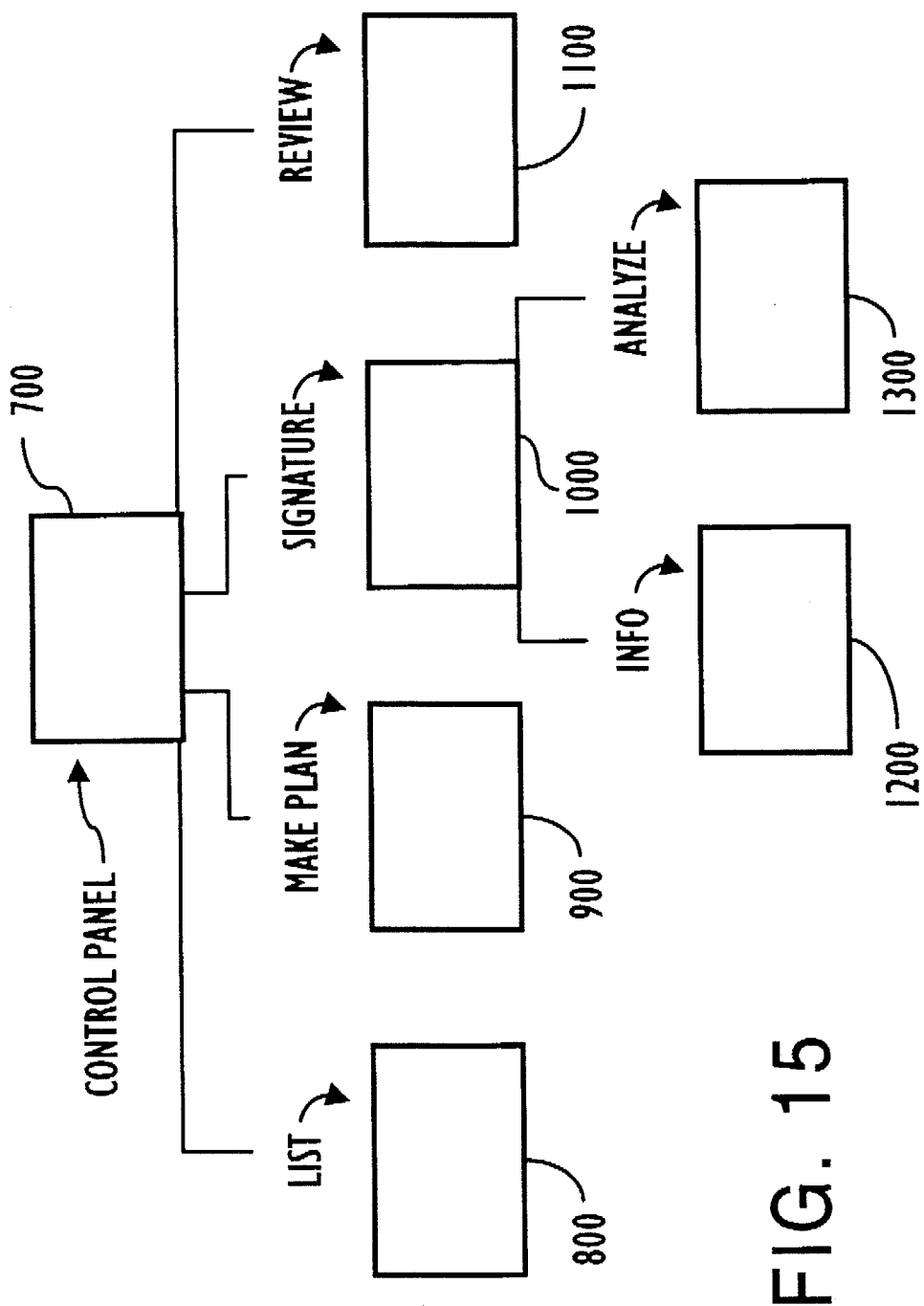
FIG. 15 shows a tree structure for the use of the various panels in the user interface of the apparatus according to the invention.

There are three levels of panels. Movement between panels in the tree structure of FIG. 15 is vertical. Operation always starts at CONTROL PANEL 700 of FIG. 7 at the top and proceeds down and then back up. A complete valve leakage survey entails preparation, valve testing and result reporting. This procession shows up as the left to right ordering of the panels: "LIST," "MAKE PLAN," "SIGNATURES," and "REVIEW," shown in FIGS. 8–11 as 800–1100, respectively.

Program operation begins automatically when the power switch is turned on. Initialization takes about two seconds. The unit, item and plan are loaded from a status file so that the user will have access to those settings last used. Operation then proceeds from the top, namely, the control panel.

The CONTROL PANEL has two main purposes. First, it defines the operating environment of the test at hand. Second, it provides function keys 702–710 to direct the user into one of the four second-level display panels, namely, "LIST," "MAKE PLAN," "SIGNATURES," and "REVIEW," or to the "QUIT" command to quit analyzer operation, respectively.

All operating data are filed under the \UNIT directory. The use of this directory allows survey work to proceed on two or more independent groups of valves without clearing and reloading for each. Valve grouping can be any level desired, such as plant, unit, system or subsystem as those skilled in the art will appreciate.

The unit key 712 is used to select the unit name, which is used as the directory on the hard drive to work with; in the DOS directory tree, this directory is located directly under \UNIT. This entry is rarely changed. One unit's work usually covers many days. Pressing this key lists the units already established. The previously active unit is highlighted. The user touches the unit name desired. Item loading will follow, and the control panel will return, displaying the results of the item load.

The correct unit should be verified at the top of the control panel every time. An incorrect selection can waste much work by using the wrong list and plans and mixing up signatures with those of a different unit.

The item key 714 pops up a numeric window to select the next primary item. The default next item (in the list) is shown in parentheses. After a number is selected, the series is reset to zero. If the item is being selected for the very first time, the primary item subdirectory will be created. Then the loading sequence is executed.

The plan key 716 lists the plans available within the particular unit. Most selection of plans should be done during building of the valve list and subsequently designing any new plans. The previously active plan is highlighted. The user touches the plan desired. If a change of plan is accepted, the program proceeds to reload the primary item signatures. In the illustrative example given in the figure, plan 20, which has five valves, is shown in piping diagram 701. In table 724 in the lower right, items 0.0 through 0.4 are shown as closed by X, open by O, or traps by T in each of steps 1 through 4. In this notation, parentheses indicate that a valve is under pressure, while slashes indicate that a valve is not under pressure, and d indicates that a differential signature (to be described below) is needed for that valve.

The series key 718 pops up the numeric window to accept entry of a series number between 0 and 15. The highest series which holds signatures is shown. The user enters a number between 0 and 15. If this number is more than 1 higher than the highest series used, it will be reduced to prevent skipping a series. If a valid change of series is accepted, the program proceeds to reload primary item signatures. On the series key, "series" is spelled "xeries" so that the user can select either the series key or the signature key by typing the first letter. Of course, other conventions could be used, such as the underlined letters well known to users of graphical user interfaces. As shown, the current series is series 0. Series 1 has a separate set of signatures and may involve a different test, e.g., after repairs rather than before repairs.

Only signatures saved under the selected series will show up as saved. The user should not mistake an incorrect series for a missing signature situation.

The frequency key 720 selects a frequency range, wherein 200 khz is the standard frequency range used for valve leakage signatures. A touch of this key immediately changes the frequency to the next selection of those available, 100/200/400/800 khz. Under each setting, any signature displayed and saved covers from 10% to 100% of the frequency range. The frequency is automatically set as signatures are loaded. The frequency cannot be changed after at least one signature is saved in a series. Frequency may be changed by advancing to the next series.

The average key 722 is used to select the average variable. There are two purposes of the average variable. The standard amplitude vs frequency signature display uses average as the length of time in seconds that the signature is averaged each time GO is pressed. Average=0 means that only a single reading is used for the signature. Touching this key causes the value to alternate between 0, 1 and 2. The second purpose of this variable is for setting the length of time that is displayed in a time sweep signature (amplitude vs time).

The list, make, signature, and review keys 702–708 switch, respectively, to the list, make, signature, and review panel analyzer operations, which will be explained below. The use of the signature key 706 presupposes the selected primary item, plan, series, frequency range, and average.

The quit key 710 terminates program operation. The analyzer returns to the DOS prompt and can then be turned off by the power switch.

Any time the item, plan or series is changed, the program automatically takes the following load sequence: it (1) searches for the primary item subdirectory on the disk and (2) loads any signatures already saved that fit the selected plan and series. Saved signatures are marked by a * in the plan.

Signature loading may lead to one of the following error messages:

"ERROR: Plan 1 used. Restore it?" If all signatures are saved under a different plan, that plan can be restored by a "yes" to this question.

"Warning: Multiple Plans Used." If some signatures were saved under a different plan, this note will pop up.

"Signatures Don't Match." If the plan has been modified and some signatures saved do not match the entry in the plan, this note will show.

"Latest Sigs Taken in Series 1." If there are signatures saved of higher series, the highest series taken will be noted to help prevent mixing new signatures with the old series.

The list panel 800 of FIG. 8 is a means to interrogate the valve list and display items meeting any selected set of criteria. The valve list is an ordered database having information categories (fields) including items, plans and identification information, and is organized as a hierarchical and relational data structure. First the operator places an entry in any number of the fields of the search definition line 802. When the desired criteria have been entered, the operator presses the search key 804 to initiate the search and display the results. Finally, the operator selects the item desired for collection and analysis by touching the item. It will be displayed at the top of the screen. The operator presses the TEST-IT key 806 to return to the control panel with the selected item.

All the fields except two use an alphanumeric text search. The search word can be any combination of letters, numbers, and certain punctuation characters, but no spaces. The allowed length is the size of the field displayed. A match requires that the complete search word be found anywhere within the corresponding field of a particular item.

Only the item and elevation fields use a numeric upper/lower limit search. The operator must enter both an upper limit and a lower limit to search by these fields. A match requires that the corresponding field entry for a particular item fall between the upper and lower limits.

To enter a search criterion in a particular field, the operator touches that field in the search define area (lines 2–5). Touch the defined key 805 and the alphanumeric or numeric window will pop up. The operator then enters the word (or number) desired and presses RETURN. RETURN with no entry removes any search criteria from that field. The ESC key 816 ignores any change of entry.

One example of a broad search is an entry in just the elevation field to assist in survey ordering by all valves located together.

The search key initiates a search of the valve list. Each item in the list is taken field by field and is rejected if any field search word is not found within the corresponding field of that item. Only if all the fields match the search criteria is the item displayed in the found list.

A broad search might return many items in the found list. These will be separated into two sections with a dotted line between them. The items above the dotted line are not yet tested while those below the dotted line have already registered a conclusion. Therefore, as the list panel is repeatedly used in the course of a survey with constant search criteria, items will be selected from the top selection to go through collection and analysis and will then show up on the bottom section.

To select an item, the user touches the item number. The user examines the highlighted item line to verify the selected item as desired. If not, the user simply touches another item or redefines the search to produce a different found list.

After a particular item has been identified (highlighted), the TEST-IT key will take that item number and return to the CONTROL PANEL just as if the operator had pressed the ITEM function and typed in that number. It will be ready to go to SIGNATURES.

The ESC key returns to the CONTROL PANEL with no change of item.

The up and down arrow keys move the cursor from the search definition area through the found list. The left and right arrows move the cursor horizontally only within the search definition area.

Figure 9:
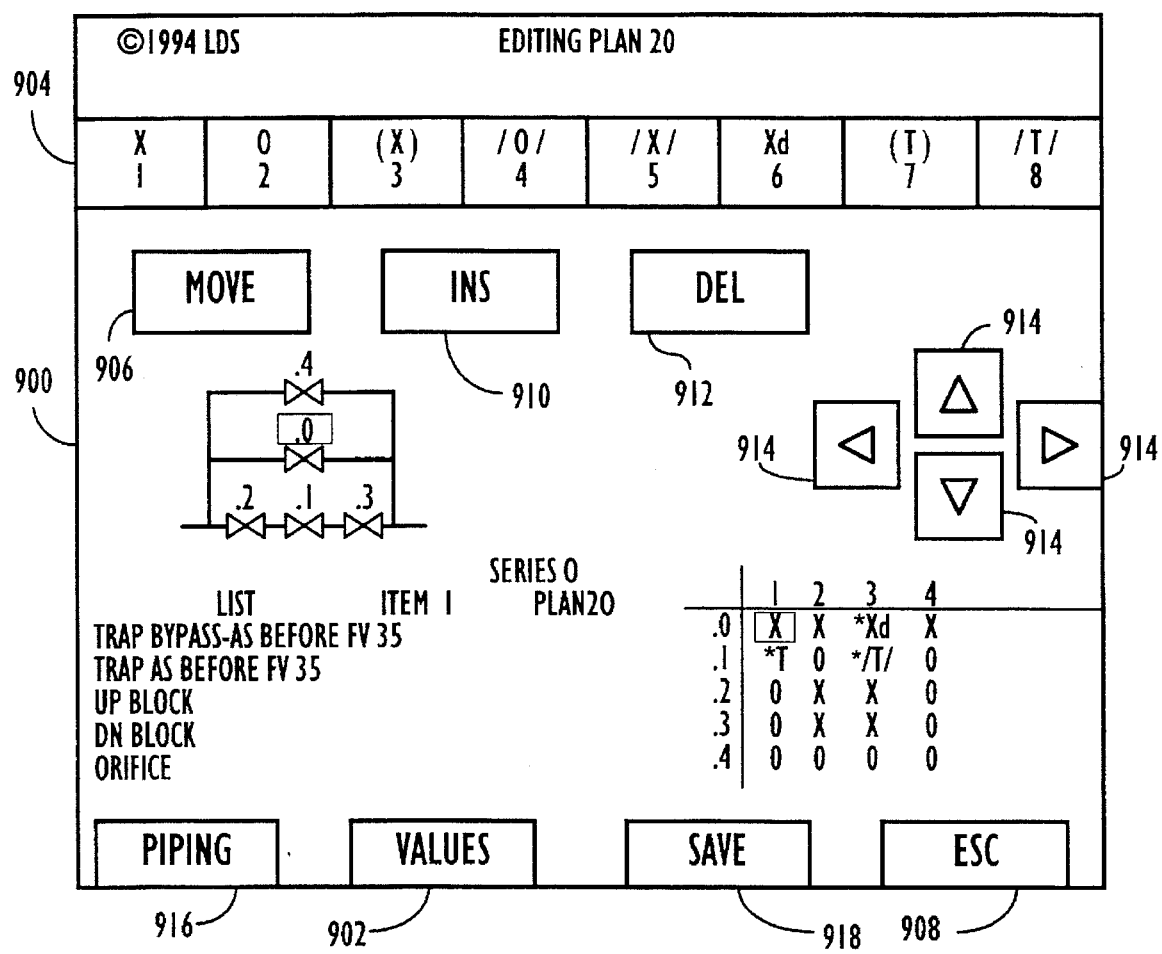
FIG. 9 shows a MAKE PANEL in the user interface of the apparatus according to the invention.
Figure 10:
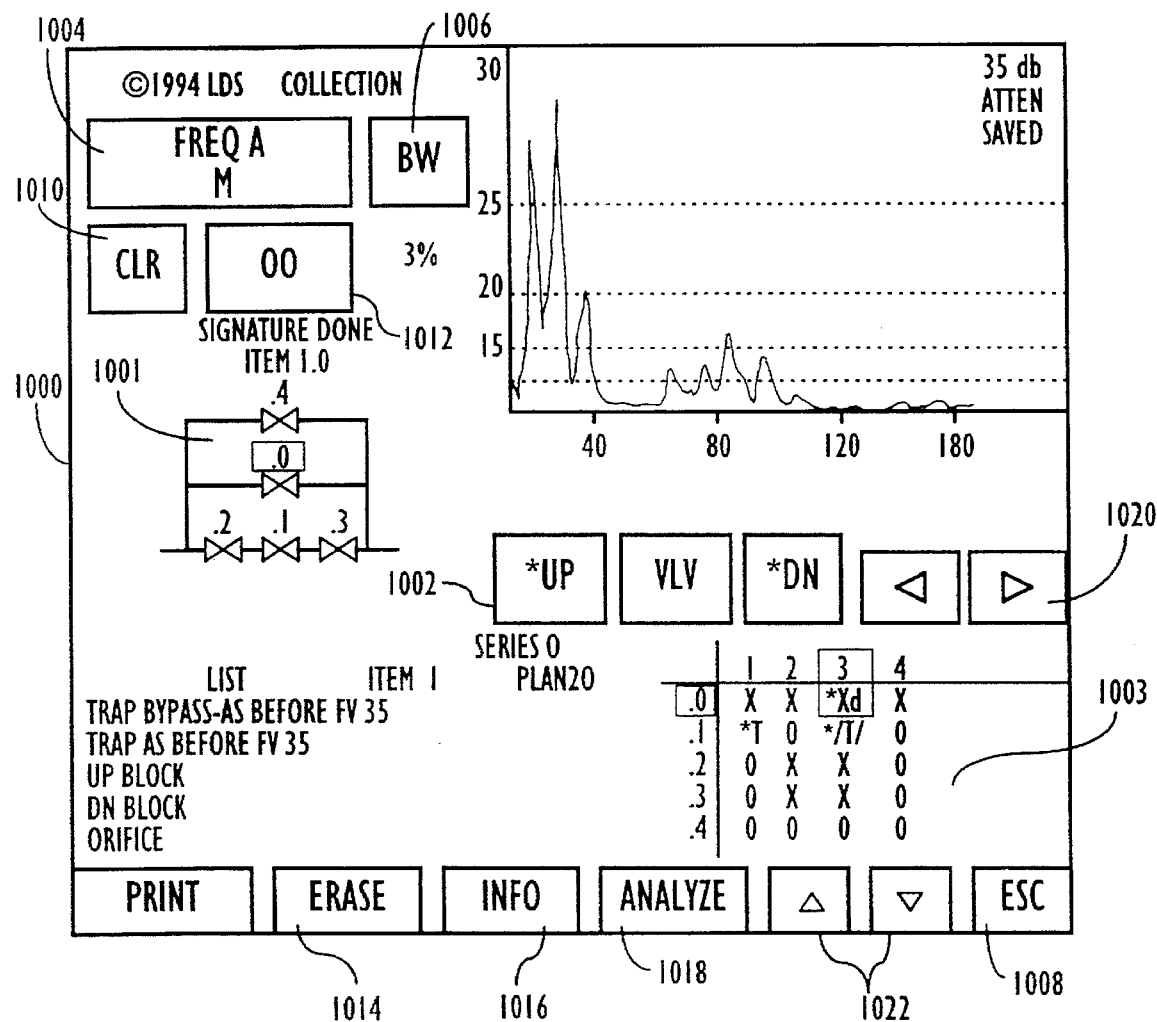
FIG. 10 shows a SIGNATURE PANEL in the user interface of the apparatus according to the invention.

The MAKE PANEL 900 of FIG. 9 provides all the tools necessary to prepare a plan to test any primary item and its associated sub items. The analyzer does not place any constraints on the plan design other than a maximum of 15 valves and 15 steps (rows and columns). The number of sub items in the plan cannot be decreased to fewer than the number showing under List. The analyzer automatically places the optimum lineup entry, X (closed) or O (open), to the left of each signature entry, (X) or /O/ or /X/ or Xd. In this notation, parentheses indicate that a valve is under pressure, while slashes indicate that a valve is not under pressure, and the d indicates that a differential signature is taken. "T" is a time signature (infra). Some keys have a dual purpose in preparing the plan in accordance with whether valves or piping is selected first and highlighted. The differences in purpose will be explained in greater detail below.

The valves key 902 are pressed to enable the following functions of the MAKE PANEL. They include all operations on the plan and on valves in the layout drawing. One valve in the drawing will be highlighted.

To place an entry into the plan table at the position of the plan cursor, the user presses one of the entry keys 904, namely, X, O, (X), /O/, /X/, Xd and T. If the cursor is on a sub item or a step, there is no effect. The various valves in the plan are indicated by decimal numerals, with 0.0 being the most important valve.

Pressing the MOVE key 906 allows the highlighted valve in the layout drawing to be moved. The arrow keys are next pressed to move the valve to the desired location; when done, the user presses the ESC key 908. The other keys do not function while MOVE is in process (MOVE key highlighted).

If the plan cursor is on a sub item, and there are fewer than 15 sub items in the plan, a new sub item row will be opened in the plan when the INSERT key 910 is pressed. If a sub item row was previously deleted, it will automatically fill in this inserted row. If the cursor is on a step number and there are fewer than 15 steps, a new step column will be opened up.

If the plan cursor is on a sub item when the DELETE key 912 is pressed, that whole sub item row will be deleted, and the rows below it will move up. An INS can be used to restore an incorrectly deleted sub item row. If the cursor is on a step number, that step column will be deleted and any columns to the right of it will move over.

The four arrow keys 914 move the plan cursor around within the plan. If the cursor is on step number at the top of the plan, moving right beyond the last step will add another step up to 15 max. If the cursor is on a sub item number at the left of the plan, moving down below the last sub item will add another sub item to a maximum of 15. If the cursor is on a sub item number at the left of the plan, pressing the left arrow will bring up the alphanumeric window requesting entry of the plan valve description. It is noted that the plan will scroll horizontally and vertically to accommodate the limited display size, and also that the highlighted valve in the layout drawing will track the sub item that the plan cursor is on.

The piping key 916 enables the MOVE, INS and DEL functions to assume their secondary purposes of operating on pipe sections in the layout drawing. One pipe, if any, in the drawing will be highlighted. These secondary purposes will now be described.

Pressing the MOVE key allows the highlighted pipe of the layout drawing to be moved. Next, the ARROW keys are pressed to move the pipe to the desired location, and finally, the user presses ESC when done. No other keys function while MOVE is in process (MOVE key highlighted).

After pressing the INSERT key to insert a pipe, an ARROW key must be pressed to determine the pipe orientation, horizontal or vertical. The highlighted pipe will appear to the right of the drawing. Next the ARROW keys are used to place it as in MOVE, and finally, the user presses ESC when done.

When the delete key is pressed, the highlighted pipe, if any, in the drawing will be deleted.

Any ARROW key causes the highlighting to move among the pipe elements in order to select the pipe section which the user desires to move or delete.

When the plan design is complete, the SAVE key 918 is pressed to save the plan on the disk drive. The display first lists the plans available within the present unit. Then it pops up the alphanumeric window to accept a name entry. Name entries can be any unique combination of up to four characters (frequently the names are just orderly numbers to ease record keeping). If the name selected is already in use, the Yes/No window asks for verification to overwrite that plan. After the plan is saved, the analyzer leaves the MAKE PANEL and returns to the CONTROL PANEL.

Actuating the ESC key causes the analyzer to leave the MAKE PANEL and return to the CONTROL PANEL. If changes have been made, a YES/NO window requests confirmation to restore the plan as last saved, and then return to CONTROL.

The purpose of the plan is to provide the organized structure for testing and analyzing a particular group of valves. Most valve groups will fit into a standard pre-tested and optimized plan thereby reserving the MAKE PANEL for preparation for an odd group or for restructuring testing under restricted access conditions.

The remaining panels are used in valve testing and analysis. Their use will now be described.

One of the most important features of the analyzer is the semi-automated signature collection process. The SIGNATURE PANEL 1000, shown in FIG. 10, leads the operator through each pressure and background signature recommended in the plan denoted by valve diagram 1001 and Table 1003. This leading follows the cycle of collecting all signatures in one step and then moving right in the plan table to the next step. A step column in the plan table represents all items (valves) residing in the indicated condition, as well as the type of signature to be collected at each item. With reference to FIG. 9, X=closed valve; O=open valve; (X) is closed valve pressure amplitude versus frequency signature; /O/ is open valve background amplitude versus frequency signature; /X/ is closed valve background amplitude versus frequency signature; Xd is combined closed valve pressure plus two background amplitude versus frequency signatures; (T) is closed pressure amplitude versus time signature; and /T/ is either closed or open background amplitude versus time signature. Moving to a different step in the plan dictates changing the condition (and thus pressure by opening or closing one or more valves in a plan) of one or more valves. The automated collection process thereby gathers pressure and the background signatures on all valves required using a minimum of valve openings and closings. Normally it starts with the plan cursor highlighting the first valve and first step. As shown in step 1, valve 0.0 is closed, and valves 0.2, 0.3 and 0.4 are open. If they are not already in this state the operator must open or close them as needed to satisfy the condition indicated. Then a time signature is taken by hitting GO and then SAVE. The rest of the steps proceed similarly.

If beginner operation is selected, a valve alignment procedure is displayed on startup and each time the cursor moves between steps. A YES/NO window announces each valve the operator should set up and its position. If all the announcements for the present step are answered "YES", the analyzer proceeds as normal. If any are answered "NO", the setup announcements for that step are stopped, but a warning will issue on each GO.

The instrument advances the cursor to the first signature in the current step and then issues the message to place the transducer on the indicated valve and to hit GO. The user hits GO and the instrument responds with the message to hit GO again until repeatability (as described below) is satisfied. When it is satisfied, the instrument prompts the user to hit SAVE, then the user hits SAVE. The instrument advances the cursor to the next signature in that step, and the above process is repeated for every signature in the step. The instrument advances the curser to the next step and returns to the valve alignment procedure described above.

One signature can be collected for each (X), /O/, /X/ and (T) and /T/ element in the plan. A differential element, Xd, requires three signatures. To collect these, whenever the plan cursor is on an Xd, an extra group of keys 1002 shows up just above the plan table. This group of keys takes the form shown for the single transducer differential analysis by default. In this case, the user will be prompted to position the transducer and hit GO and SAVE for each of the three locations, as described above. If the user wishes to perform a two-transducer differential analysis, he hits the MODE key, and then keys for the two-transducer differential analysis appear. In this case the prompting asks the user to place two transducers at appropriate locations rather than just one, so that two signatures can be taken simultaneously.

The Go-Save routine is completed for each location by either manually touching valve, or one of the three keys 1002 or letting the analyzer automatically advance through them. The saved * in the plan table represents the valve signature of an Xd set while the up and down signatures saved are marked by the * on the corresponding keys.

Signatures displayed on the SIGNATURE PANEL are scaled by the ATTEN (attenuation) setting. To shrink down the display, the user may touch anywhere in the lower half of the signature box. To enlarge the display details, the user touches the display anywhere in the upper half of the box. The ATTEN changes in steps of 5 dB from −10 to 60 dB. A change of 5 dB equals a magnification of 1.78, while 60 dB indicates a magnification of 1,000. The absolute signal amplitudes are determined by adding the ATTEN value to the approximated dB number of the peak as read off the left side of the signature. In the signature panel shown in FIG. 10, the ATTEN setting is 35 dB.

The MODE key 1004 cycles through the available modes for a certain plan element. Mode changes the function of the BW key 1006, whose use will now be described. Under modes A, B, and A-B, the MODE key switches the display smoothing bandwidth between 11 % and 3% of the frequency range. In time sweep mode, the display shows amplitude vs time. This amplitude is an average over a fixed frequency band having a width of 10% of the frequency range. When the BW key is pressed, the display switches to amplitude vs frequency. The transducer is placed on the trap (a type of valve, as those skilled in the art will appreciate) and the display is touched anywhere to read a signature. Next, the time sweep center frequency is chosen by touching the signature at an appropriate area of high signal. The dark bar under the signature indicates the frequency band to be averaged. The Esc key 1008 is pressed when the band selected is correct. The display will revert back to time sweep mode with the selected center frequency displayed under the BW key.

The CLR key 1010 removes any signature started by GO but not SAVED, allowing the GO procedure to be restarted. It is used whenever the initial GO on a valve produces a non-repeatable signature due to a bad application of the transducer to the valve.

The GO key 1012 starts GO, which is the central function of the whole analyzer. The most time is spent here actually testing valves. Any time the plan cursor highlights a signature type, namely, one of (X), /O/, /X/, Xd, and T, one of these messages is displayed under the CLR and GO keys and GO can be pressed.

"Place transducer on item 1.0 and press GO." When GO is pressed, the analyzer acquires the signature and displays it unless one of these messages appears: "Not settled; retake" or "CHECK: Reseat transducer on Item 1.0 and press GO."

"Good repeatability; press Save." All signature elements in the plan except for T (time sweep) employ a repeatability test requesting more than one GO press. The initial GO at a particular plan element displays as a solid line. Subsequent GO readings show as a dotted line and are used only for repeatability checking. If it passes, a SAVE is requested. If it does not pass, the check message is repeated. If the initial reading was not good (cannot be repeated), CLR must be pressed to retake an initial.

GO on a time sweep starts a slow time trace of amplitude (see BW). The length depends on the average set in the control panel. Time sweep signatures do not request a repeatability check because of their time dependent nature. Save is requested when done.

If the present element already had a saved signature, indicated as "*" in the plan, it will be noted as "SAVED" on the signature, and will display as a solid line until GO acquires a new signature.

Each signature must be manually saved to keep it for further analysis by pressing SAVE after a GO has produced a repeatable signature. The solid line (initial GO reading) on the display will be stored on the disk drive under the proper file name. The save function may produce one of the following messages:

"Not stable, save anyway?" If the GO function could not produce a repeatable signature, a SAVE can be carried out with a YES to this question.

"This series has data saved. Do you want to overwrite?" If a previous signature was saved at this Sub Item and Step, this YES/NO window will request confirmation to overwrite. "Do you want to save to the next series?" If it is not desired to overwrite (lose the previous signature), then a YES answer to this window will automatically advance to the next series. The plan will reflect the saved status of all signatures in the new series. The series number is printed just above the plan.

If there is a signature already saved at the present sub item and step, the ERASE key 1014 will ask for a YES/NO confirmation and then erase the signature from the disk drive. This is used if the user does not plan to overwrite an improperly taken signature.

SAVE also automatically advances the cursor through the plan to the next uncompleted signature. First it checks for the next signature to complete the present step. If no more are needed the cursor moves to the next step, follows the valve alignment prompting procedure and continues to check that step as above. If all signatures are completed, the message is displayed: "Plan Completed".

The INFO key 1016 switches the analyzer down to the INFO PANEL.

The ANALYZE key 1018 key switches the analyzer down to the ANALYZE PANEL. This is commonly used after the plan is filled in with as many signatures as are required to obtain a recommended result and/or to draw a conclusion. The ANALYZE function does not have to be used immediately after taking the signatures on the items in one plan. A primary item can be reelected in the control panel and this function accessed at any time.

The ESC key 1008 moves the analyzer up to the CONTROL PANEL.

The LEFT/RIGHT ARROW keys 1020 above the plan move the plan cursor between steps of the plan. If the signatures elements in that step have not been saved, a warning message will appear. If beginner mode is enabled, the alignment check is stepped through each time.

The UP/DOWN keys 1022 below the plan move the plan cursor between the valves (sub items) of the plan.

The valve layout drawing reflects both the position (valve) that the plan cursor rests on and the state of each valve at the cursored step in the plan. Closed valves (i.e. X, (X), /X/ or Xd elements) are filled in the drawing. Open valves (i.e. O or /O/ elements) are not filled in.

The REVIEW PANEL 1100 of FIG. 11 provides an overview of survey completion and outputs to feed the work to other databases.

The initial panel lists all primary item numbers having any signatures taken. If any results have been recorded, the date of the last will be displayed next to the item number.

The review item key 1102 pops up the numeric window to enter an item number. If RETURN is pressed, the display switches back to CONTROL PANEL and then to signatures using the entered item. A more direct way to do this is simply touch the item number on the screen.

The LIST ALL KEY 1104 is pressed to see a full listing of completed signatures, results and comments. Those shown are only the first series. First, on the left is the item number followed by columns of plan elements, each representing one completed signature. These elements are displayed as in the plan table except for uncompleted and non-signature elements not shown. Next, the extra series column is marked if signatures have been taken in additional series. That is followed by the results and then the comments that have been entered.

When the output key 1106 key is pressed, all results and comments are compiled into a file named RESULTS.CMP. This data can be directly imported into PARADOX for reporting.

When the ZIP key 1108 is pressed, all work for the unit is zipped into one file for backup purposes. This includes VALVE LIST, PLANS, SIGNATURES, RESULTS and INFORMATION FILES. The file name is <Unit>.EXE. This file is self-extracting archive, as those familiar with archived files will know. After backing up with the ZIP key, the operator can QUIT from operation of the program and then use the DOS COPY to copy this file to a 3.5 inch floppy disk. The use of this size floppy disk, of course, is given as an illustrative example; those skilled in the art who have reviewed this specification will understand what other machine readable media (e.g., computer readable media) can be used and under what circumstances.

Restoration onto another computer is done by creating the proper directory for the UNIT, copying the zipped file to it, and typing the UNIT name, i.e.:

<Unit> /d /o where <Unit> is the name of the UNIT which the survey covers. For example, if the unit name is LAB2, the self-extracting archive will be named LAB2.EXE, and the command to restore the data will be LAB2 /d /o.

The ESC key 1110 returns the display to the CONTROL PANEL.

FIG. 12 shows the INFO PANEL 1200. As can be seen from this figure, the INFO PANEL allows display and input of information about each valve.

FIG. 13 shows the ANALYZE PANEL 1300. By comparing the signatures, the user can determine the existence and severity of leaks by the differential signature method described above. It is also possible to automate (described below) determination of the dominant frequency and thus to automate signature comparison to obtain a recommended result, which the user can then accept or reject as a conclusion.

FIG. 14 shows the CONCLUDE PANEL 1400. In this panel, column 1402 identifies each item. Column 1404 identifies the result for each item, where L=leaking, L2=probably leaking, T=tight, T2=probably tight, NA=not applicable, and NT=not tested. It is emphasized that the CONCLUDE PANEL is a visual representation of the analysis performed by the device of the invention. This analysis is deemed a recommended result. An operator may draw a conclusion from the displayed result and accept the result as is or override the result. Whatever decision is made by the operator, his decision is conclusive but, of course, derived after evaluating the recommended result. The operator's conclusion is entered through multiple-choice window 1410. Column 1406 gives the estimated size of each leak, small, medium, or large. Column 1408 allows a free-form comment for each valve including the user's conclusion.

Now that the user interface has been described, the procedures followed by the program which controls the apparatus will be detailed with reference to the flow charts set forth in FIG. 16–34. Some of these procedures can be implemented in off-the-shelf business software, such as PARADOX for data management, EXCEL or QUATTRO PRO for numerical analysis, and WORD for report preparation.

Figure 16:
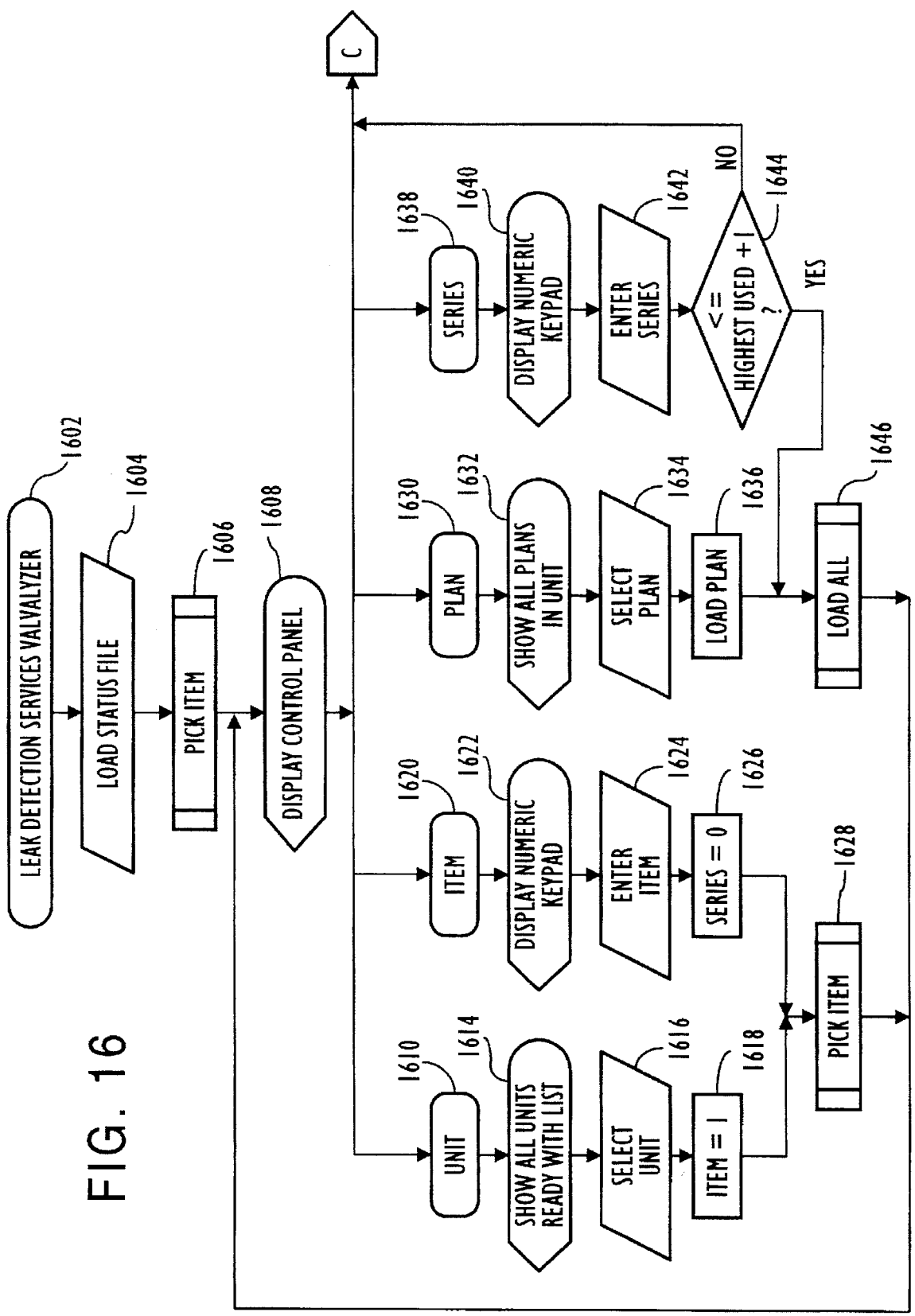
FIG. 16 shows the first part of a flow chart of the initialization of the apparatus and the operation of the CONTROL PANEL.
Figure 17:
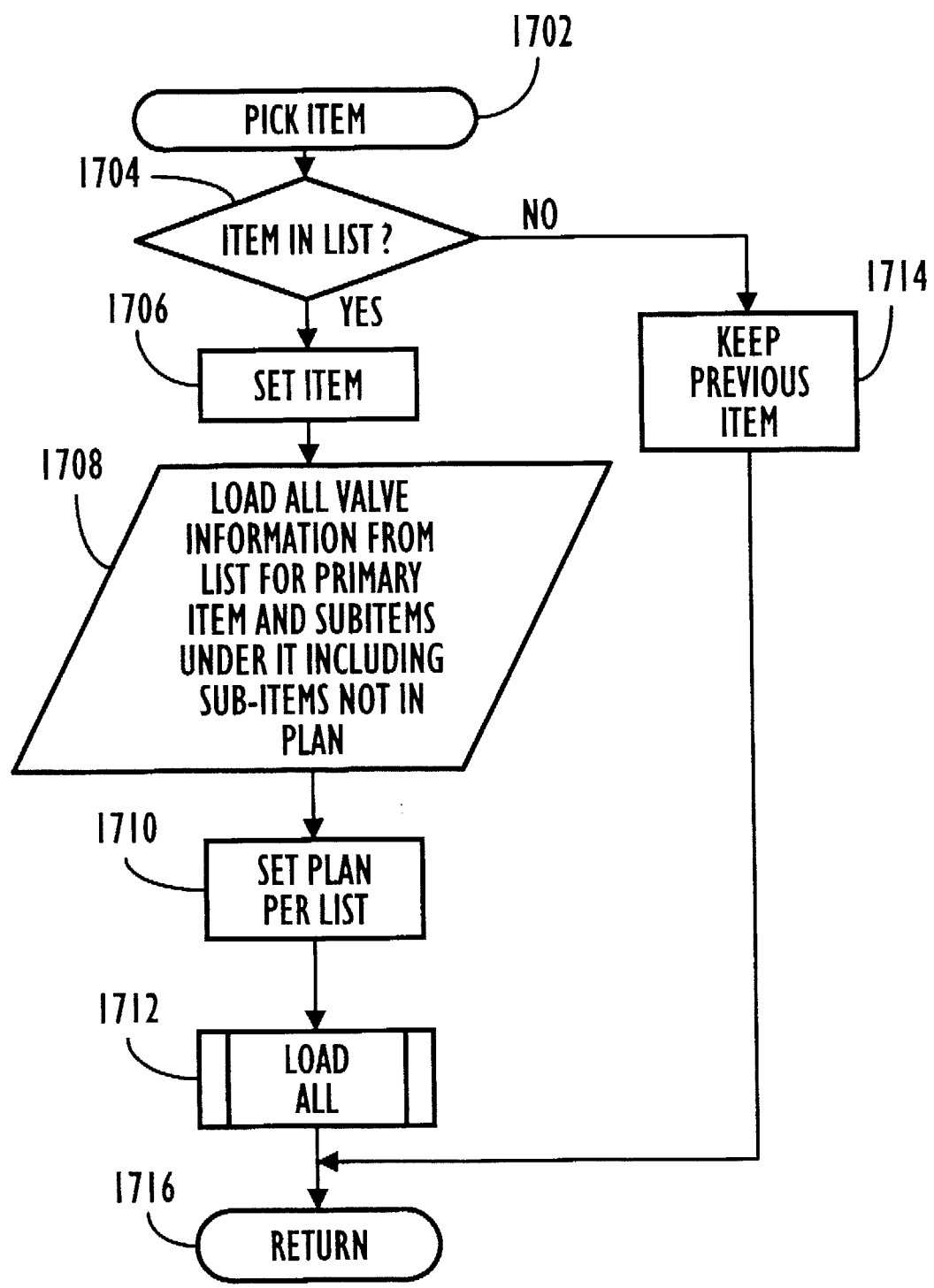
FIG. 17 shows a flow chart of the "PICK ITEM" operation.
Figure 18:
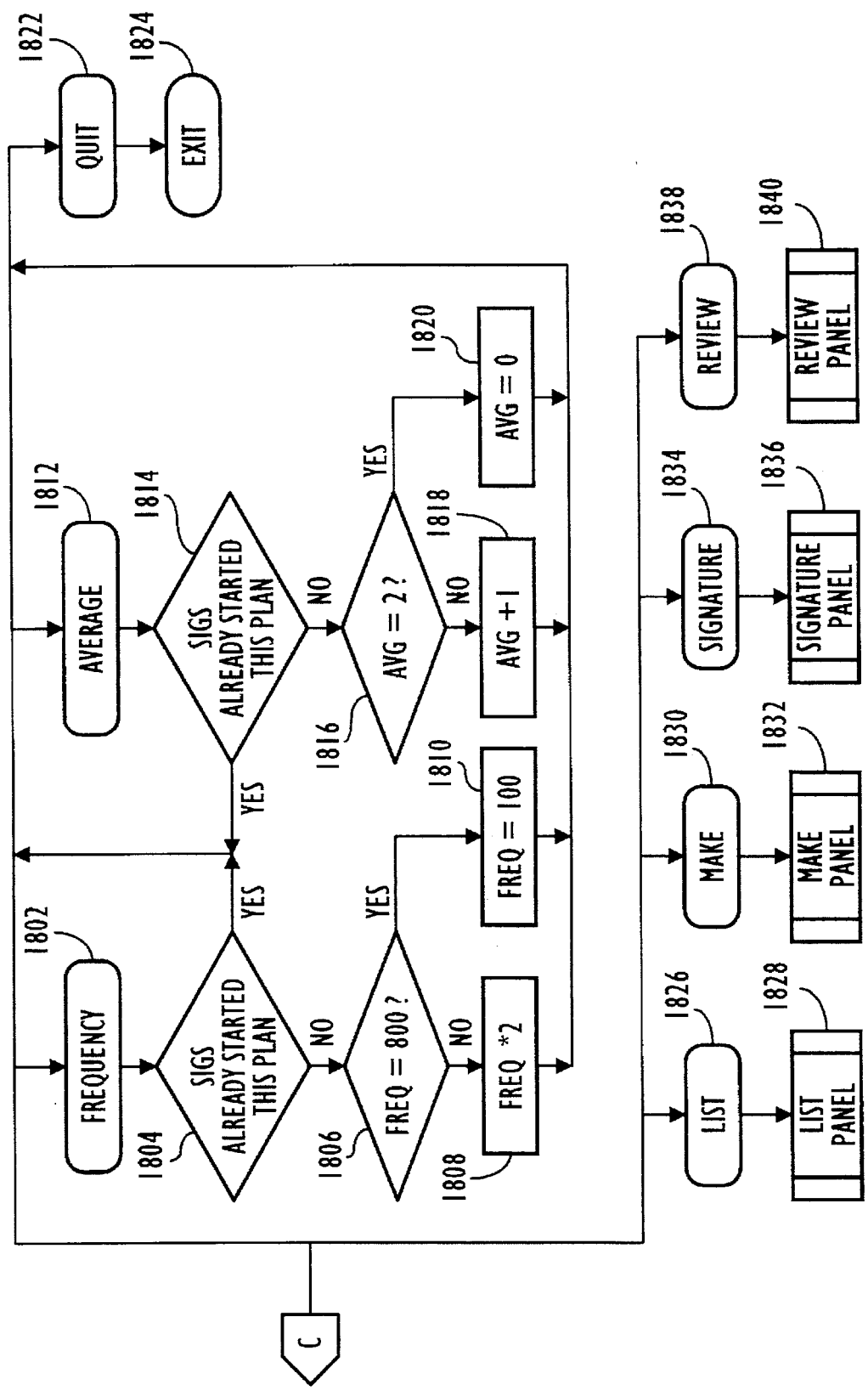
FIG. 18 shows the second part of the flow chaff of the initialization of the apparatus and the operation of the CONTROL PANEL.

The operation of the apparatus from switching on the power to selecting one of the four panels directly underneath the CONTROL PANEL is shown in the flow chart split between FIGS. 16 and 18. When the apparatus is powered on (step 1602), the status file is loaded (step 1604), and the item is picked in the PICK ITEM operation (step 1606; to be described in further detail below with reference to FIG. 17). The CONTROL PANEL is displayed in step 1608. From the control panel, which is displayed in step 1608, the user can then pick a unit number (by selecting the UNIT button in step 1610, in which case the apparatus shows all units ready with a list in step 1614 and the user selects a unit in step 1616), in which case the item number defaults to 1 (step 1618), or can pick an item number (by selecting the ITEM button in step 1620, in which case the apparatus displays a numeric keypad in step 1622 and the user enters an item in step 1624), in which case the series number defaults to 0 (step 1626). Either way, the PICK ITEM operation begins again (step 1628). The user can also pick a plan (by selecting the PLAN button in step 1630, in which case the apparatus shows all plans in the unit in step 1632, the user selects a plan in step 1634, and that plan is loaded in step 1636) or a series (by selecting the SERIES button in step 1638, in which case the apparatus displays a numeric keypad in step 1640, the user enters a series in step 1642, and the apparatus determines whether the series entered is less than or equal to the highest series used plus one in step 1644). If the user picks a plan, or if the result of the determination in step 1644 is "yes," the LOAD ALL operation begins (step 1646; to be described in further detail below with reference to FIG. 19). If the result of the determination in step 1644 is "no," the user is returned to the CONTROL PANEL. Once the PICK ITEM or LOAD ALL operation finishes, the user is returned to the control panel. The user can also pick a frequency (step 1802) or an average (step 1812). In either case, the apparatus checks whether signatures are already started in this plan (step 1804 or 1814). If so, the user is returned to the CONTROL PANEL. If not, in the case of frequency, the apparatus checks to see whether the frequency is 800 (step 1806). If not, the frequency is doubled (step 1808); if so, the frequency is set to 100 (step 1810). In the case of average, the apparatus checks to see whether the average is two (step 1816). If not, the average is incremented by one (step 1818). If so, the average is set to zero (step 1820). The user may also press QUIT (step 1822), in which case the program is exited (step 1824). Once any of these procedures except QUIT is done, the user may go into LIST (step 1826 and 1828), MAKE (steps 1830 and 1832), SIGNATURE (steps 1834 and 1836), or REVIEW (steps 1838 and 1840).

The PICK ITEM operation will now be described with reference FIG. 17. When this operation is called (step 1702), it is checked whether the item number designated is in the list (step 1704). If not, the previous item is kept (step 1714), and control is returned to the operation that called the PICK ITEM operation (step 1716). If the item number designated is in the list, the item is set (step 1706), the valve information is loaded (step 1708), the plan per list is set (step 1710), and the LOAD ALL operation is commenced (step 1712). Once the LOAD ALL operation is finished, control is returned to the operation that called the PICK ITEM operation.

Figure 19:
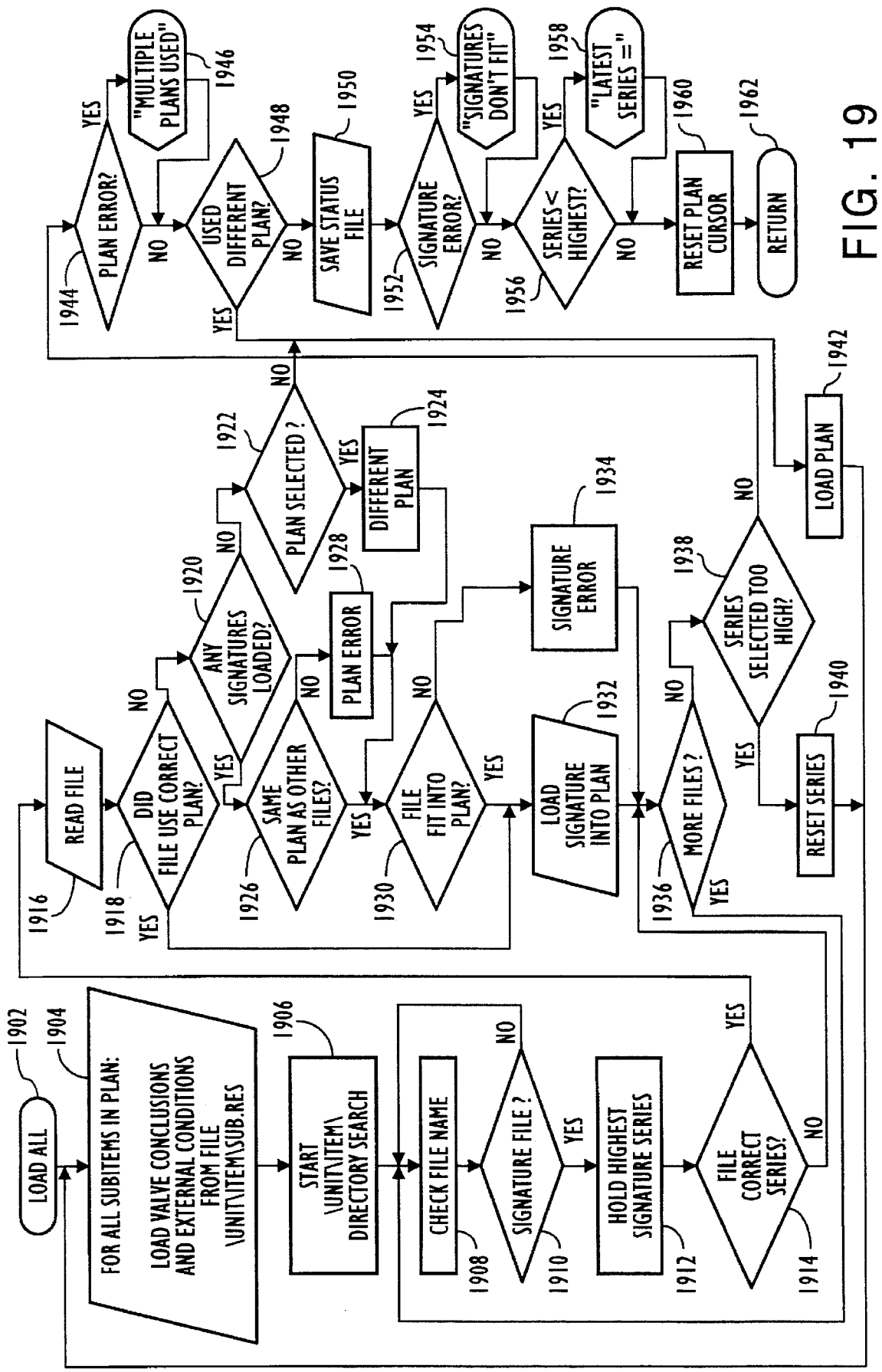
FIG. 19 shows a flow chaff of the "LOAD ALL" operation.

The LOAD ALL operation will now be described with reference to FIG. 19. Once this operation is called (step 1902), for all subitems in the plan, the valve conclusions and external conditions are loaded (step 1904), and the \unit\item\ directory is searched (step 1906). Each file name is checked (step 1908) to see whether it is for a signature file (step 1910), and the highest signature series is held (step 1912). If the file is not the correct series, and there are more files, the search continues (steps 1914 and 1936), and if the series selected is too high, the series is reset (steps 1938 and 1940). If the file is the correct series, the file is read to see whether the signature should be loaded into the plan or whether there is a signature error in the following manner. A file is read (step 1916), and it is determined whether the file used the correct plan (step 1918). If so, the signature is loaded into the plan (step 1932). If the file did not use the correct plan, it is determined whether any signatures are loaded (step 1920). If not, it is determined in step 1922 whether a plan is selected. If no plan is selected, a plan is loaded in step 1942; if a plan is selected, a different plan is requested in step 1924. If any signatures are loaded, it is determined in step 1926 whether the plan is the same plan as in the other files. If not, a plan error is noted in step 1928. If the plan is the same plan, it is determined in step 1930 whether the file fits into the plan. If not, a signature error is noted in step 1934. If the file does fit into the plan, the signature is loaded into the plan in step 1932. Steps 1936, 1938, and (if needed) 1940 are rerun. If the series selected is not too high, the plan is checked for a plan error in step 1944. If there is a plan error, the apparatus displays "Multiple plans used" in step 1946. After this display, or if there is no plan error, it is determined in step 1948 whether a different plan is used. If so, the plan is loaded in step 1942. If not, the status file is saved in step 1950. In step 1952, it is checked whether there is a signature error. If so, the apparatus displays in step 1954 the message "Signatures don't fit." After this display, or if there is no signature error, the apparatus determines in step 1956 whether the series is lower than the highest series. If so, the apparatus prompts the user in step 1958 for the highest series. Either way, the plan cursor is reset in step 1960, and control is returned to the operation that called the LOAD ALL operation (step 1962). There is also a provision to load a plan (step 1942) if no plan is selected or if a different plan was used.

Figure 20:
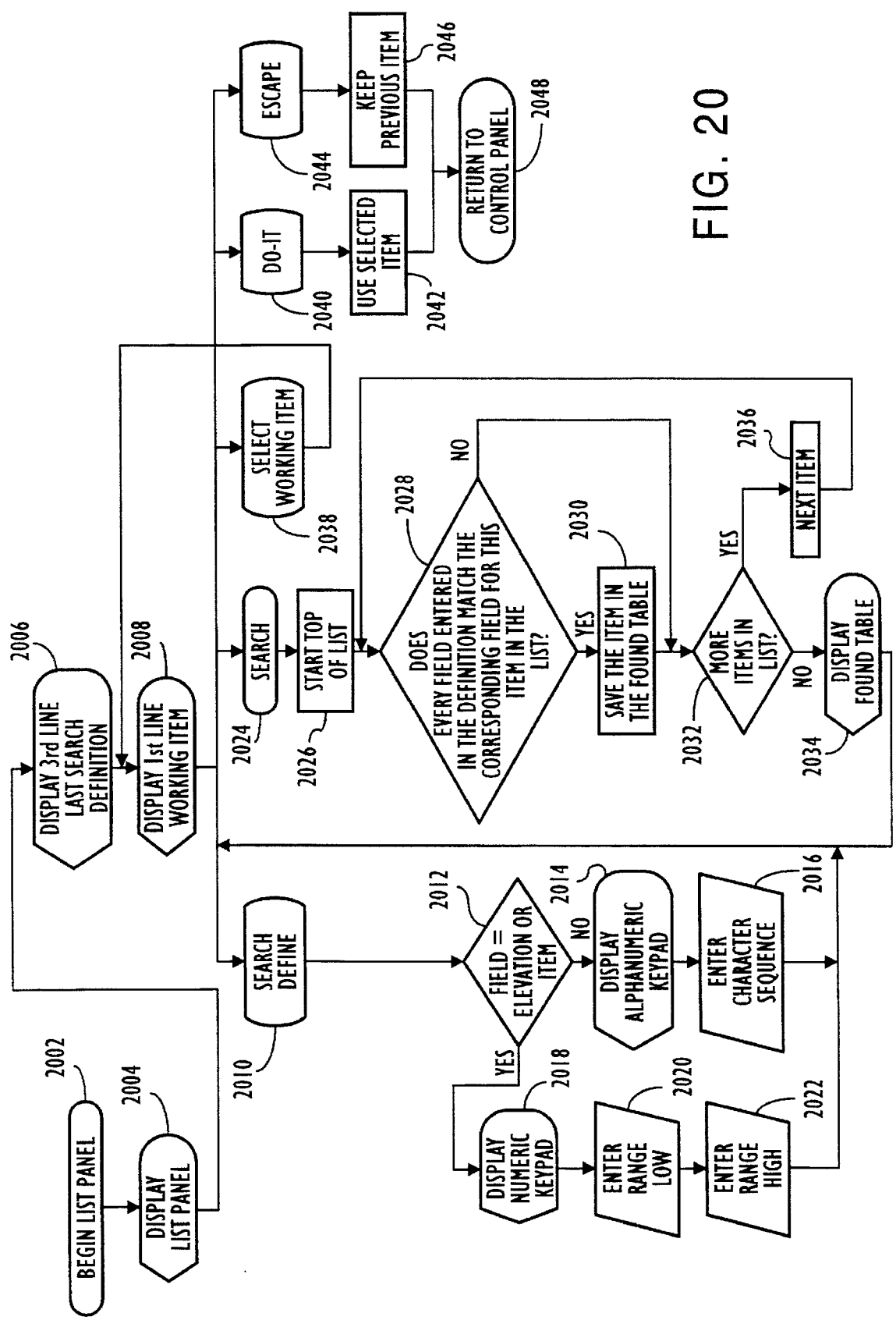
FIG. 20 shows a flow chaff of the operation of the LIST PANEL.

The operation of the LIST PANEL will be described with reference to FIG. 20. When this panel is called (step 2002), it is displayed (step 2004), the last search definition is displayed (step 2006), and the working item is displayed (step 2008). Now, the user may define a search (steps 2010–2022), perform a search (steps 2024–2036), select the working item (step 2038), and then press either DO-IT to use the selected item (steps 2040 and 2042) or ESC to keep the previous item (steps 2044 and 2046). Then the user is returned to the control panel (step 2048). Searches are defined and performed in the following manner. To define a search, the user selects the SEARCH DEFINE button in step 2010. In step 2012, the apparatus determines whether the field is an elevation or an item. If not, the apparatus displays an alphanumeric keypad (step 2014) so that the user can enter a character sequence (step 2016). If so, the apparatus displays a numeric keypad (step 2018) so that the user can enter a range low value (step 2020) and high value (step 2022). To search, the user selects the SEARCH button in step 2024. The apparatus starts at the top of the list in step 2026 and determines in step 2028 whether every field entered in the definition matches the corresponding field for the item in the list. If so, the item is saved in the "found" table in step 2030. Then, or if the determination in step 2028 results in a "no" answer, the apparatus determines in step 2032 whether there are more items in the list. If so, the apparatus moves to the next item in step 2036 and repeats steps 2028, 2030 (as needed), and 2032. Once there are no more items in the list, the "found" table is displayed in step 2034.

Figure 21:
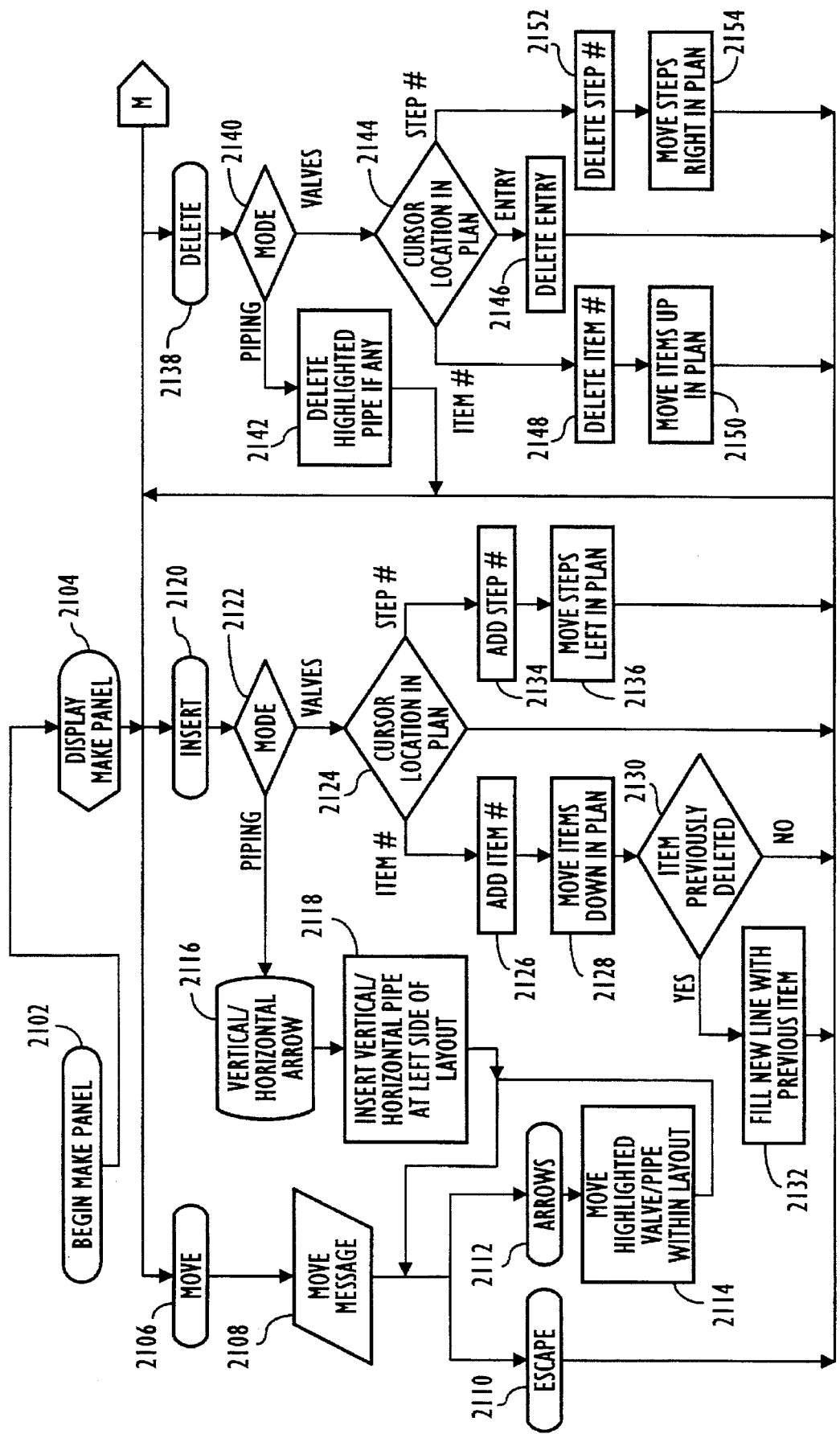
FIGS. 21 and 22 show a flow chart of the operation of the MAKE PANEL.
Figure 22:
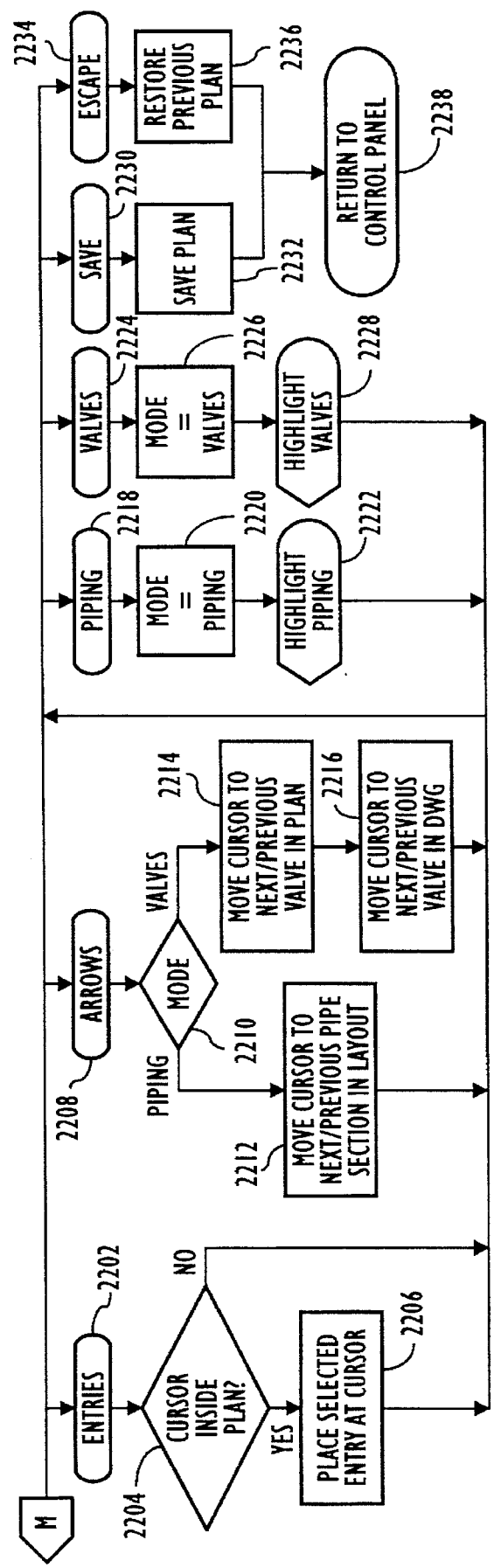
Figure 23:
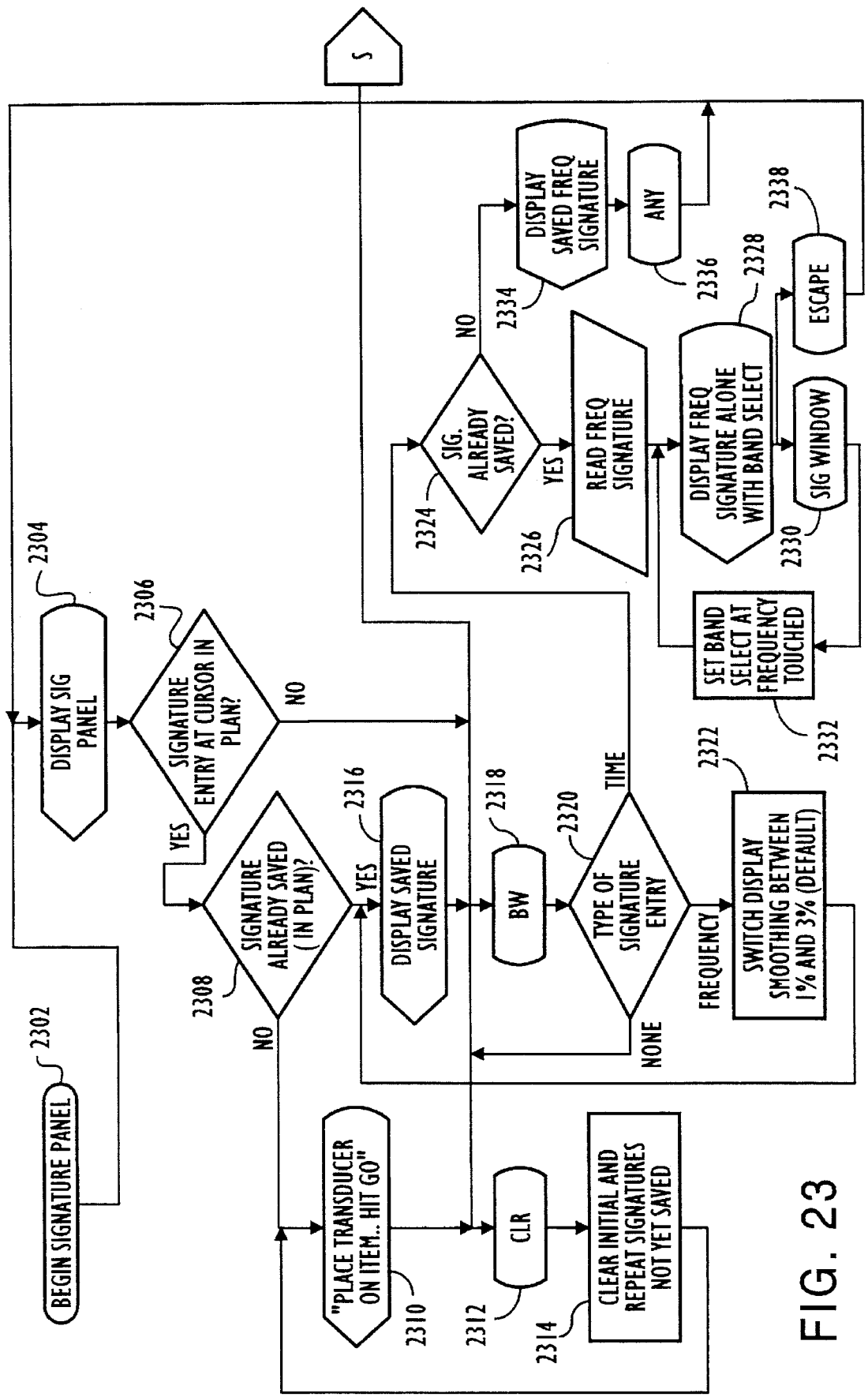
FIGS. 23, 24A, 24B, 25 and 26 show a flow chart of the operation of the SIGNATURE PANEL.

The operation of the MAKE PANEL will be described with reference to FIGS. 21 and 22. When this panel is called (step 2102), it is displayed (step 2104). The user can now move valves or pipes (steps 2106–2114), insert piping (steps 2120, 2122, 2116, and 2118), insert valves (steps 2120–2136), delete piping (steps 2138–2142), delete valves (steps 2138, 2140, and 2144–2154), make entries (steps 2202–2206), use the arrow keys to move the cursor to a specific pipe section or valve (steps 2208–2216), or select piping or valve mode The above operations are performed in the following manner. To move a valve or pipe, the user hits the MOVE button in step 2106, whereupon the apparatus displays the MOVE message in step 2108. The user then has the options of hitting ESC in step 2110 or selecting an arrow key in step 2112. If the user selects an arrow key, the highlighted valve or pipe is moved within the layout in step 2114. To insert piping, the user hits the INSERT button in step 2120. In step 2122, the apparatus determines whether it is in "valves" mode or "piping" mode. If the apparatus is in "piping" mode, it displays a vertical/horizontal arrow in step 2116 to allow the user to insert a vertical or horizontal section of pipe at the left side of the layout in step 2118. Then the user may move the inserted section of pipe using the arrow keys as described above. If the apparatus is in "valves" mode, it determines the cursor location within the plan in step 2124. If the cursor location is at an item number, an item number is added in step 2126, the items are moved down in the plan in step 2128, and if it is determined in step 2130 that an item has previously been deleted, a new line is filled with the previous item in step 2132. If the cursor location is at a step number, a step number is added in step 2134, and steps are moved to the left in the plan in step 2136. To delete piping or valves, the user selects the DELETE button in step 2138. The apparatus determines in step 2140 whether it is in "piping" mode or "valves" mode. If the apparatus is in "piping" mode, it deletes the highlighted pipe, if any, in step 2142. If the apparatus is in "valves" mode, it determines the cursor location in the plan in step 2144. If the cursor location is on an item number, that item number is deleted in step 2148, and items are moved up in the plan in step 2150. If the cursor location is on an entry, the entry is deleted in step 2146. If the cursor location is on a step number, that step number is deleted in step 2152, and steps are moved to the right in the plan in step 2154. To make an entry, the user selects the ENTRIES button in step 2202. If it is determined in step 2204 that the cursor is inside the plan, the selected entry is placed at the cursor in step 2206.

To move the arrow keys to a specific section of piping or to a specific valve, the user selects the ARROWS button in step 2208. The apparatus determines in step 2210 whether it is in "piping" mode or "valves" mode. Depending on the mode, the apparatus either moves the cursor to the next or previous pipe section in the layout in step 2212 or moves the cursor to the next or previous valve in the plan in step 2214 and moves the cursor to the next or previous valve in the drawing in step 2216. To place the apparatus in the "piping" mode, the user selects the PIPING button in step 2218. The apparatus sets its mode to "piping" in step 2220 and highlights a section of piping in step 2222. Similarly, to place the apparatus in the "valves" mode, the user selects the VALVES button in step 2224. The apparatus sets its mode to "valves" in step 2226 and highlights valves in step 2228. Then the user saves the plan (by selecting the SAVE button in step 2230, whereupon the apparatus saves the plan in step 2232) or escapes to restore the previous plan either way, the user is returned to the CONTROL PANEL (step 2238).

The operation of the SIGNATURE PANEL will be described with reference to FIGS. 23, 24A, 24B, 25 and 26. When this panel is called (step 2302), it is displayed (step 2304). It is determined whether there is a signature entry at the cursor in the plan (step 2306). If so, it is determined whether the signature is already saved (and marked in the plan with an asterisk) (step 2308). In accordance with this determination, the user is guided through the steps of taking a signature (by displaying the message "Place transducer on item . . . hit GO" in step 2310 and allowing the user to hit the CLR button in step 2312, in which case the apparatus clears the initial and repeats signatures not yet saved in step 2314), or the saved signature is displayed (step 2316). When the BW button is hit (step 2318), the type of signature entry is determined (step 2320). If the signature is a frequency signature, the user is given the option of switching display smoothing between 1% and 3% (step 2322). If the signature is a time signature, various options are provided for displaying the frequency signature. These options include the following. The apparatus determines in step 2324 whether the signature is already saved. If not, the saved frequency signature is displayed in step 2334, and the user hits any button in step 2336 to continue. If the signature is already saved, the frequency signature is read in step 2326, and the frequency signature is displayed alone with a band select in step 2328. If the user hits SIG WINDOW in step 2330, the band select is set at the frequency touched in step 2332, and step 2328 is repeated. The user also has the option of hitting ESC in step 2338.

Figure 24A:
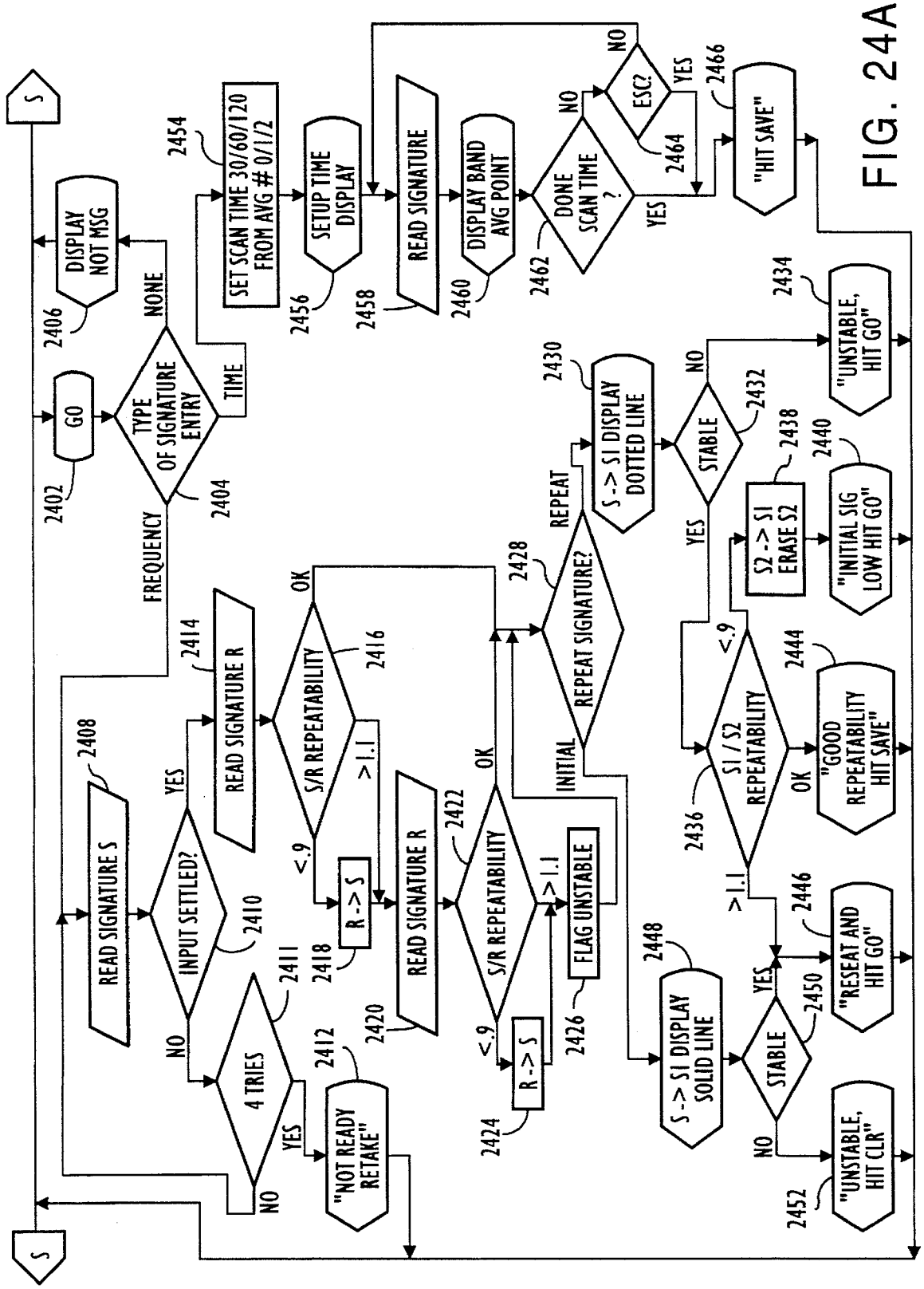
Figure 24B:
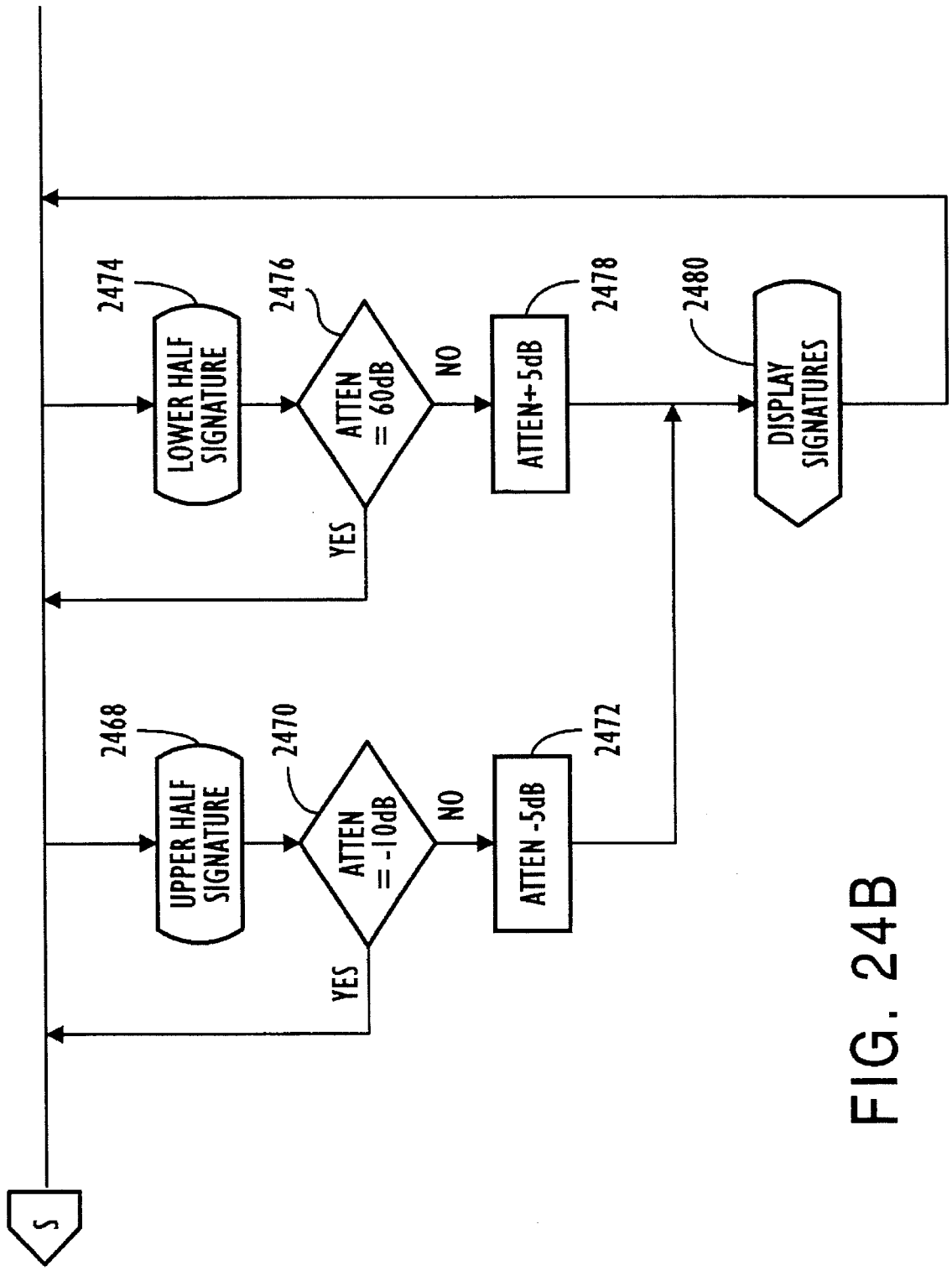

Reference will now be made to FIG. 24A when the "GO" button is pressed (step 2402) the type of signature entry is determined in step 2404. If none, a message is displayed to that effect in step 2406. Otherwise, the user is guided through the steps of collecting a frequency signature (steps as shown in FIG. 24B, anytime) or a time signature (steps 2454–2466). More specifically, if the type of signature entry is "frequency," signature S is read in step 2408, and it is determined in step 2410 whether the input is settled. If not, four tries are given in step 2411 to read signature S, and if after the four tries the input is still not settled, the apparatus displays the message "Not ready; retake" in step 2412. If the input is settled, signature R is read in step 2414, and S/R repeatability is determined in step 2416 in a manner to be described below. If the S/R repeatability is determined to be less than 0.9, signature R is redefined as signature S in step 2418. Thereafter, or if the S/R repeatability is determined to be greater than 1.1, another signature R is read in step 2420, and the S/R repeatability is again determined in step 2422.

If this repeatability is less than 0.9, signature R is redefined as signature S in step 2424. Thereafter, or if the repeatability is greater than 1.1, the signature is flagged as unstable in step 2426. Thereafter, or if the S/R repeatability is determined in step 2416 or 2422 to be acceptable (0.9≦repeatability≦1.1), it is determined in step 2428 whether the signature is an initial signature or a repeat signature. If the signature is an initial signature, signature S is defined as S1 in step 2448 and is displayed with a solid line. It is determined whether the signature is stable in step 2450; in accordance with this determination, the apparatus displays either "Unstable; hit CLR" in step 2452 or "Reseat and hit GO" in step 2446. If the signature is a repeat signature, signature S is defined as S2 in step 2430 and is displayed with a dotted line. In step 2432, it is determined whether signature S2 is stable. If not, the apparatus displays "Unstable, hit GO" in step 2434. If signature S2 is stable, the apparatus proceeds to step 2436, in which the S1/S2 repeatability is determined. If this repeatability is acceptable (0.9≦repeatability≦1.1), the apparatus displays "Good repeatability; hit SAVE" in step 2444. If the repeatability is greater than 1.1, the apparatus displays "Reseat and hit GO" in step 2446. If the repeatability is less than 0.9, the apparatus redefines S2 as S1 and erases S2 in step 2438 and then displays "Initial Sig Low; Hit GO" in step 2440.

On the other hand, if the type of signature entry is determined in step 2404 to be "time," the scan time is set to 30, 60, or 120 in step 2454 in accordance with whether the average is set to 0, 1, or 2. "Setup time display" is displayed in step 2456, and a signature is read in step 2458. In step 2460, the band average point is displayed. In step 2462, it is determined whether the scan time is done. If yes, the apparatus displays "Hit Save" in step 2466. If no, the apparatus determines in step 2464 whether the ESC button has been hit. If so, the apparatus proceeds to step 2466. If not, the apparatus returns to step 2458.

An important function of the SIGNATURE PANEL is the determination of repeatability of signature taking. The measurement of valve acoustic noise by a transducer is dependent upon good coupling of the noise into the transducer. Although it is impossible to verify maximum coupling with 100% certainty, experience has shown that the maximum attainable coupling for a particular valve is repeatable to better than 1 dB. This attainable signal is then a function of the transducer contact force, angle and coupling compound used. Sensitivity to each of these conditions shows greater than 60 db variation in level. Thus, the only condition which produces a stable level, assuming human control, is the maximum attainable coupling.

The operation of the SIGNATURE PANEL automatically performs the following repeatability measurement on every signature collection, while providing the user with the needed instruction messages to carry out the user operations indicated:

1. The user seats the transducer on the valve and hits GO (step 2402). The first signature produced at a valve is displayed as a solid line (S1) (step 2448).
2. The user lifts the transducer, reseats it on the valve and hits GO again. This second signature is displayed as a dotted line (S2) (step 2430).
3. The system computes the following:

$$\text{Repeatability} = \sqrt{\Sigma(S1(f) - S2(f))^2} \ / \sqrt{\Sigma(S1(f))^2}$$

where S1(f) is the magnitude function of frequency and Σ is a sum over the 10% to 100% frequency range (step 2436).

4. The user goes back to step 2 to retake another S2 and compare it to S1 if the repeatability is not less than 10% (1 dB) (step 2446).

If the repeatability is less than 10% (1 dB), the signature is good. If not, the user goes back to step 2 or 3 according to the message (depending upon the 2nd level repeatability). This repeatability criterion is adjustable. Prior processes required human judgment, which varied from operator to operator.

The second level repeatability check is a test (not conclusive) of the variation of the signature with time while the transducer is held in one position. Each time GO is hit, either two or three signatures are taken quickly. If they do not repeat by the same criteria as above, the highest is kept but marked as unstable.

The repeatability will come out OK only if that first signature was stable. If it does not, either the cause is poor transducer coupling at S1, or the system is unstable (background noise or pressure). An appropriate message is displayed leading the operator to a good signature or a conclusion of time varying instability. In that case, a differential or time signature might be able to support a conclusion.

Figure 25:
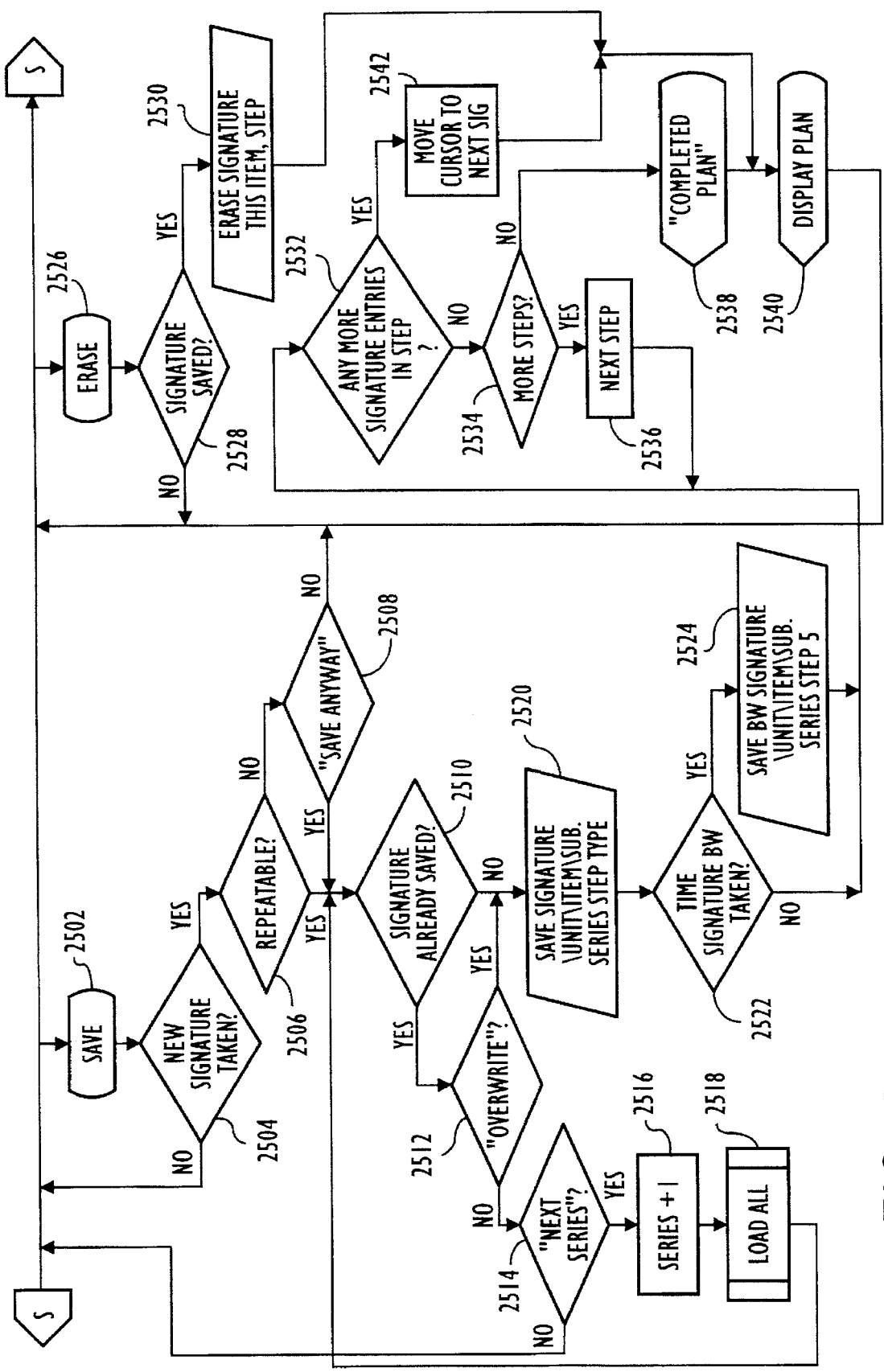
Figure 26:
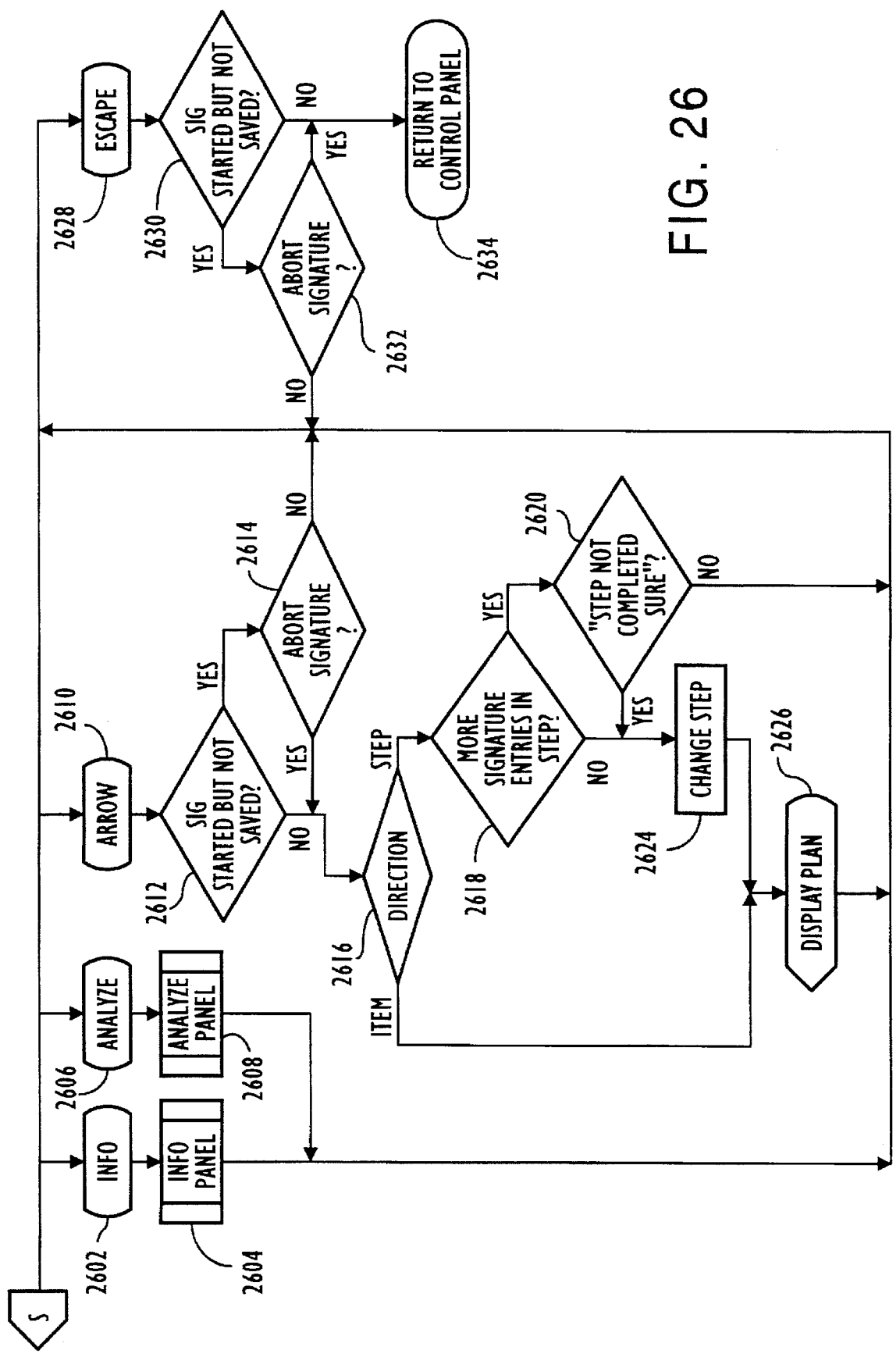

As shown in FIG. 24B, anytime a signature is displayed, the user can change the attenuation by pressing the upper or lower half of the signature (steps 2468–2480). As shown in FIG. 25, after a signature is collected with the GO button, the user can choose to save the signature (steps 2502–2524) or to erase it (steps 2526–2542). The operations for saving and erasing the signature proceed as shown in FIG. 25. If the user selects SAVE in step 2502, the apparatus determines in step 2504 whether a new signature is taken; if so, it determines in step 2506 whether the signature is repeatable. If the signature is repeatable, or if the user answers yes to "Save anyway?" in step 2508, the apparatus determines in step 2510 whether the signature is already saved; if so, it determines whether the user elects to overwrite the signature in step 2512. If the user answers "no" in step 2512, the apparatus prompts the user with "Next series?" in step 2514. If the user answers yes, the apparatus increments the series by one in step 2516 and performs the LOAD ALL operation in step 2518. If the signature is not already saved, or if the user has elected to overwrite, the signature is saved in step 2520, and it is determined in step 2522 whether the time signature BW is taken, in which case it is saved in step 2524. Whether such a signature is taken, it is determined in step 2532 whether there are any more signature entries in the step. If so, the cursor is moved to the next signature in step 2542, and the plan is displayed in step 2540. If not, it is determined in step 2534 whether there are more steps. If not, a message is displayed in step 2538 indicating that the plan is completed, and the plan is displayed in step 2540. If so, the operation goes to the next step in step 2536. If the user hits the "Erase" button in step 2526, it is determined in step 2528 whether the signature is saved. If not, there is nothing to erase. If so, the signature for this item and step is erased in step 2530, and the plan is displayed in step 2540. As shown in FIG. 26, if, the user needs to skip some signatures or complete them in a different order, he can use the arrow keys to move the cursor to a different item and/or step in the plan (steps 2610–2626). When the user hits the "Arrow" button in step 2610, the apparatus determines in step 2612 whether a signature is started but not saved, and if so, it is determined in step 2614 whether the signature is aborted. If the answer is "no" in step 2612 or "yes" in step 2614, it is determined in step 2616 whether the direction is the direction of an item or a step. If an item, the plan is displayed in step 2626. If a step, it is determined in step 2618 whether there are more signature entries in the step. If there are, the apparatus prompts the user in step 2620 with "Step not completed; sure?" If the user answers yes, or if there are no more signature entries in the step, the step is changed in step 2624, and the plan is displayed in step 2626. When the user hits the "Esc" button in step 2628, the apparatus determines in step 2630 whether a signature is started but not saved; if so, it determines in step 2632 whether to abort the signature. If the answer is "no" in step 2630 or "yes" in step 2632, the apparatus returns to the control panel in step 2634. In addition, the user can choose the INFO PANEL (steps 2602 and 2604) or the analyze panels (steps 2606 and 2608), or to escape and return to the control panel (steps 2628–2634).

Figure 27:
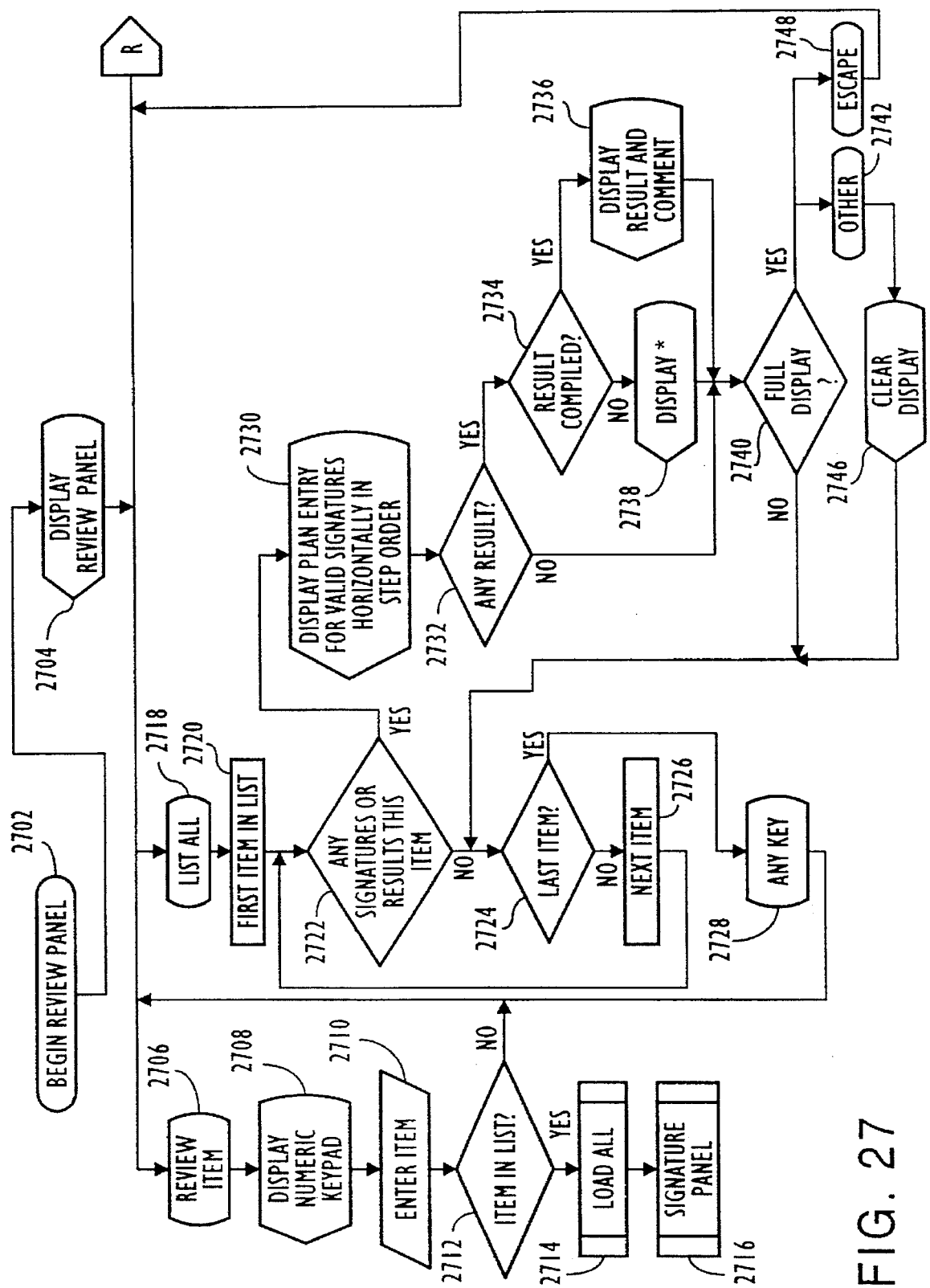
FIGS. 27 and 28 show a flow chaff of the operation of the REVIEW PANEL.
Figure 28:
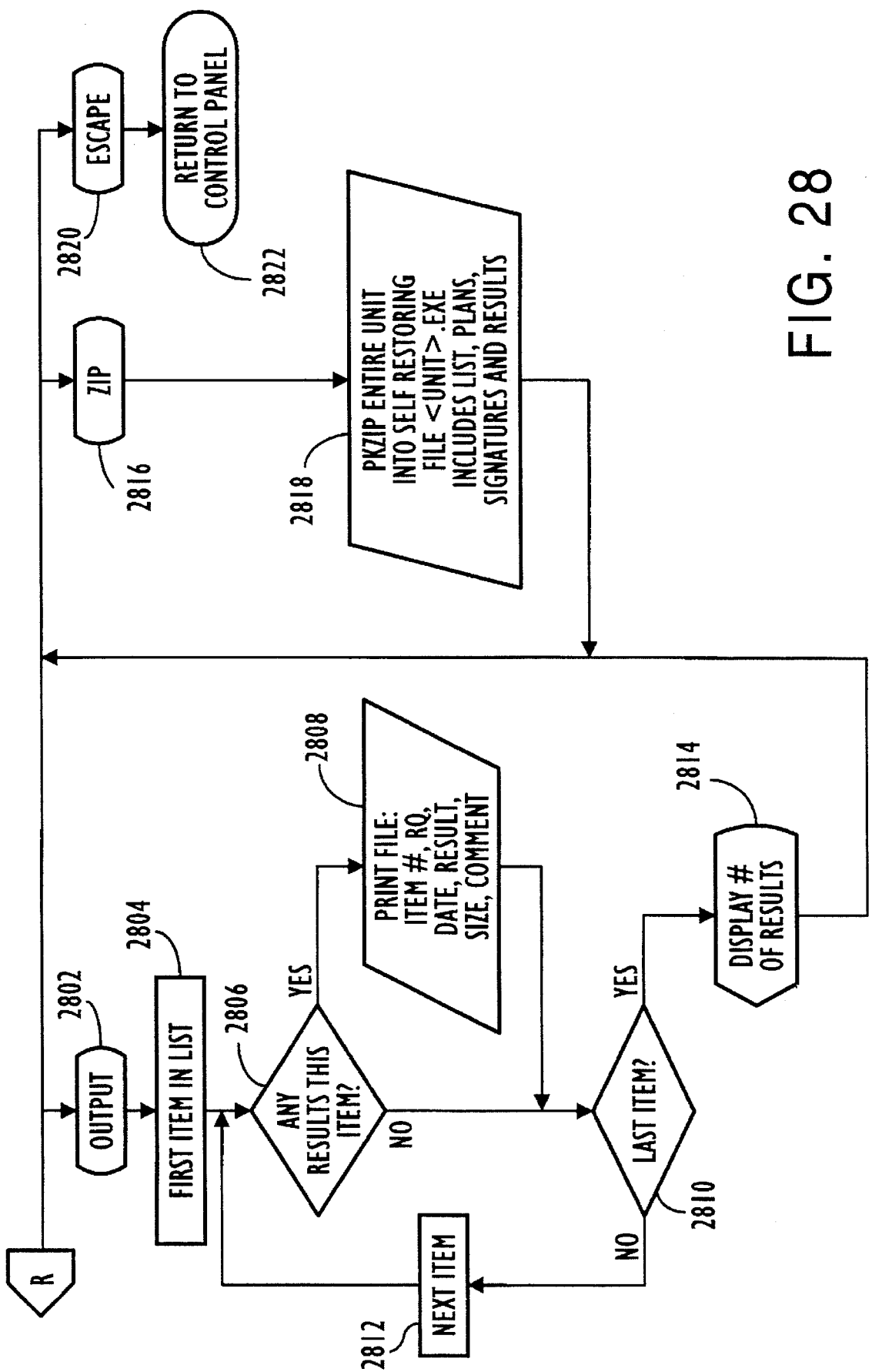

The operation of the REVIEW PANEL will be described with reference to FIGS. 27 and 28. When this panel is selected (step 2702), it is displayed (step 2704). It is possible to review an item by number (steps 2706–2716) or to list all items (steps 2718–2742, 2746 and 2748). When the user hits the "Review Item" button in step 2706, the apparatus displays the numeric keypad in step 2708, and the user enters an item in step 2710. The apparatus determines in step 2712 whether the item is in the list; if so, the apparatus performs the "Load All" routine in step 2714 and the "Signature Panel" routine in step 2716. When the user hits the "List All" button in step 2718, the apparatus goes to the first item in the list in step 2720 and determines in step 2722 whether there are any signatures or results in this item. If not, the apparatus determines in step 2724 whether the item is the last item; if so, any key ends this operation in step 2728. If the item is not the last item, the apparatus goes to the next item in step 2726 and returns to step 2722. If there are any signatures or results in an item, the apparatus displays in step 2730 the plan entry for valid signatures horizontally in step order and determines in step 2732 whether there is any result. If so, and the result is determined in step 2734 to be compiled, the result and a comment are displayed in step 2736. If the result is not compiled, a "*" (asterisk) is displayed in step 2738. After either of these displays, or if there is no result, it is determined in step 2740 whether there is a full display. If so, hitting the "Escape" button in step 2748 ends the operation, while hitting any other button in step 2742 clears the display in step 2746. If there is no full display, or after the display is cleared, the operation proceeds to step 2724. It is also possible to output information (steps 2802–2814), to zip the unit into the self-extracting archive described above (steps 2816 and 2818), or to escape to the control panel (steps 2820 and 2822). When the user hits the "Output" button in step 2802, the apparatus proceeds to the first item in the list in step 2804 and determines in step 2806 whether there are any results in this item. If so, the file is printed in step 2808. After printing, or if there are no results, it is determined in step 2810 whether the item is the last item. If not, the apparatus proceeds to the next item in step 2812 and returns to step 2806. If the item is the last item, the number of results is displayed in step 2814. When the user hits the "Zip" button in step 2816, the unit is zipped into a self-extracting archive file (self-restoring file) in step 2818. The zipping operation is well known to those familiar with the use of IBM-compatible microcomputers and will not be described in detail here. When the user hits the "Escape" button in step 2820, the apparatus returns to the CONTROL panel in step 2822.

Figure 29:
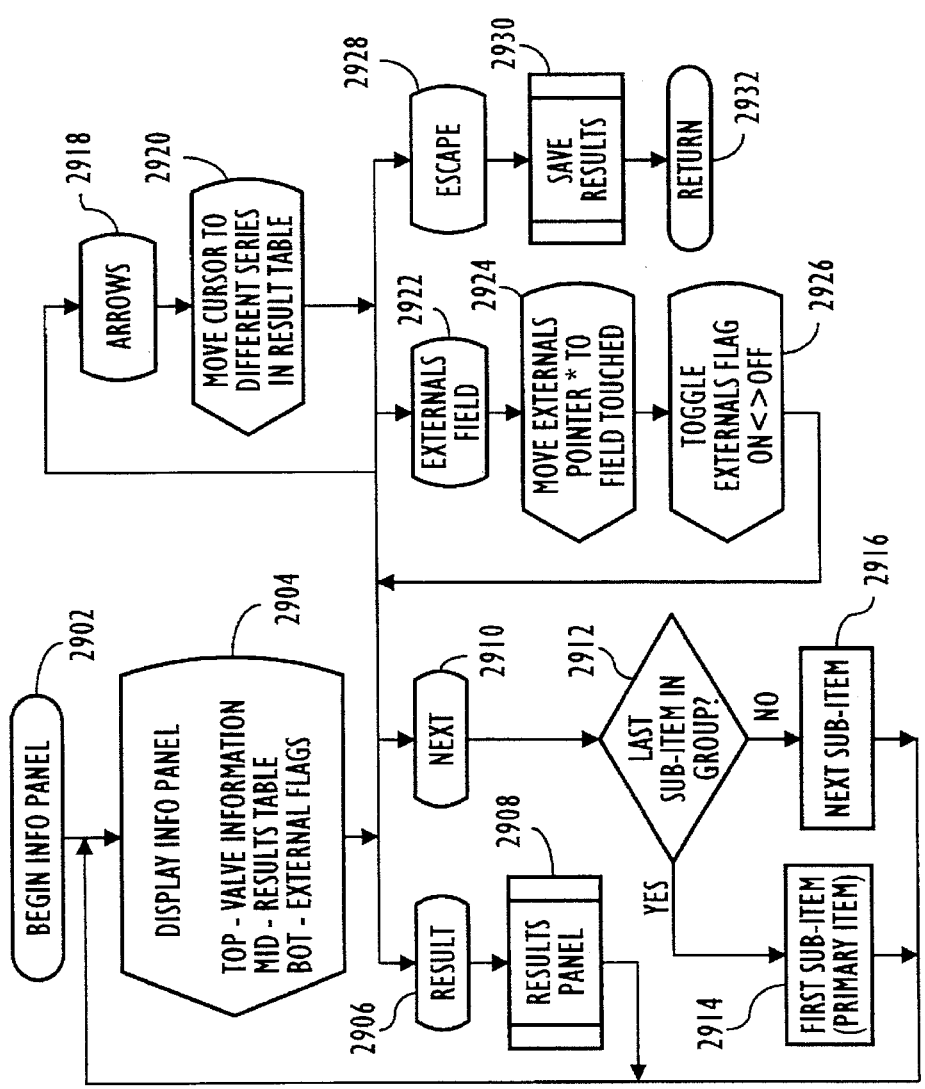
FIG. 29 shows a flow chart of the operation of the INFO PANEL.

The operation of the INFO PANEL will be described with reference to FIG. 29. When this panel is selected (step 2902), it is displayed, including the valve information, results table, and external flags (step 2904). At this time, the CONCLUDE PANEL may be selected (steps 2906 and 2908), or the user may move to the next sub-item, if there is one (steps 2910–2916). When the user hits the "Next" button in step 2910, the apparatus determines in step 2912 whether the sub-item is the last sub-item in the group. If so, the apparatus proceeds in step 2914 to the first sub-item (primary item). If not, the apparatus proceeds in step 2916 to the next sub-item. Either way, the apparatus proceeds to step 2904. The arrow keys may be used to move the cursor to different series in the result table (steps 2918 and 2920). When the externals field is touched, (step 2922), the externals pointer is moved to the field touched (step 2924), and the externals flag is toggled on/off (step 2926). When the escape key is touched (step 2928), the results are saved (step 2930; saving results will be explained below with reference to FIG. 30), and operation is returned to the control panel (step 2932).

Figure 30:
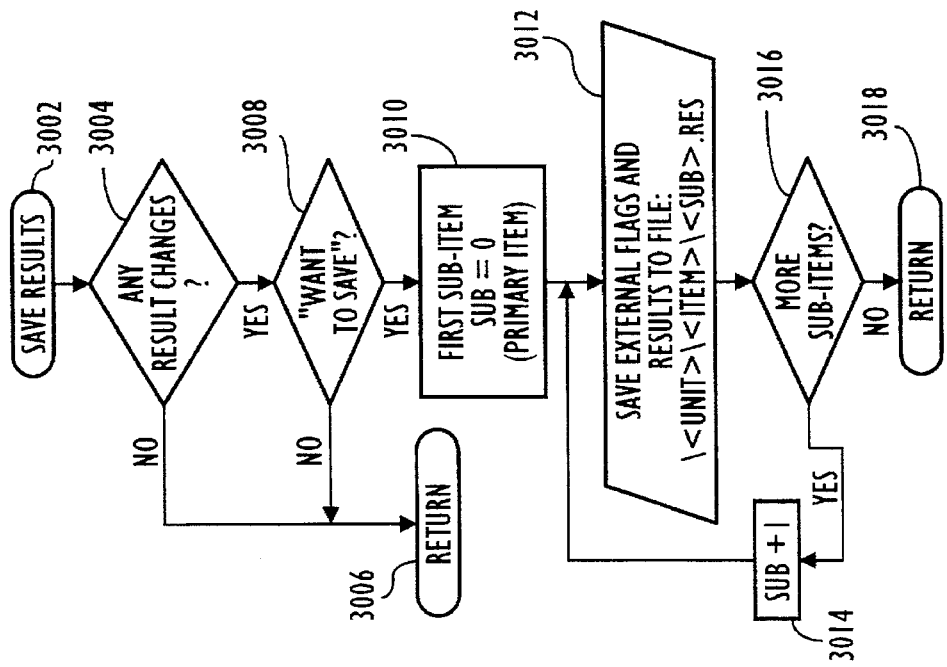
FIG. 30 shows a flow chart of the SAVE RESULTS operation within the INFO PANEL.

The operation of saving results will be explained with reference to FIG. 30. When this operation is called (step 3002), it is determined whether there have been any result changes (step 3004), and if so, the user is asked whether they are to be saved (step 3008). If there are no result changes, or if the user elects not to save them, control is returned to the previous operation (step 3006). If the user elects to save the result changes, each sub-item is saved in turn (steps 3010–3016), and control is returned to the previous operation (step 3018). Each sub-item is saved in turn in the following manner. In step 3010, the apparatus starts with the first sub-item (primary item, sub-item no. 0). In step 3012, the apparatus saves the external flags and results. In step 3016, the apparatus determines whether there are more sub-items. If so, the sub-item number is incremented by one (the next sub-item is moved to) in step 3014, and step 3012 is repeated for this next sub-item.

Figure 31:
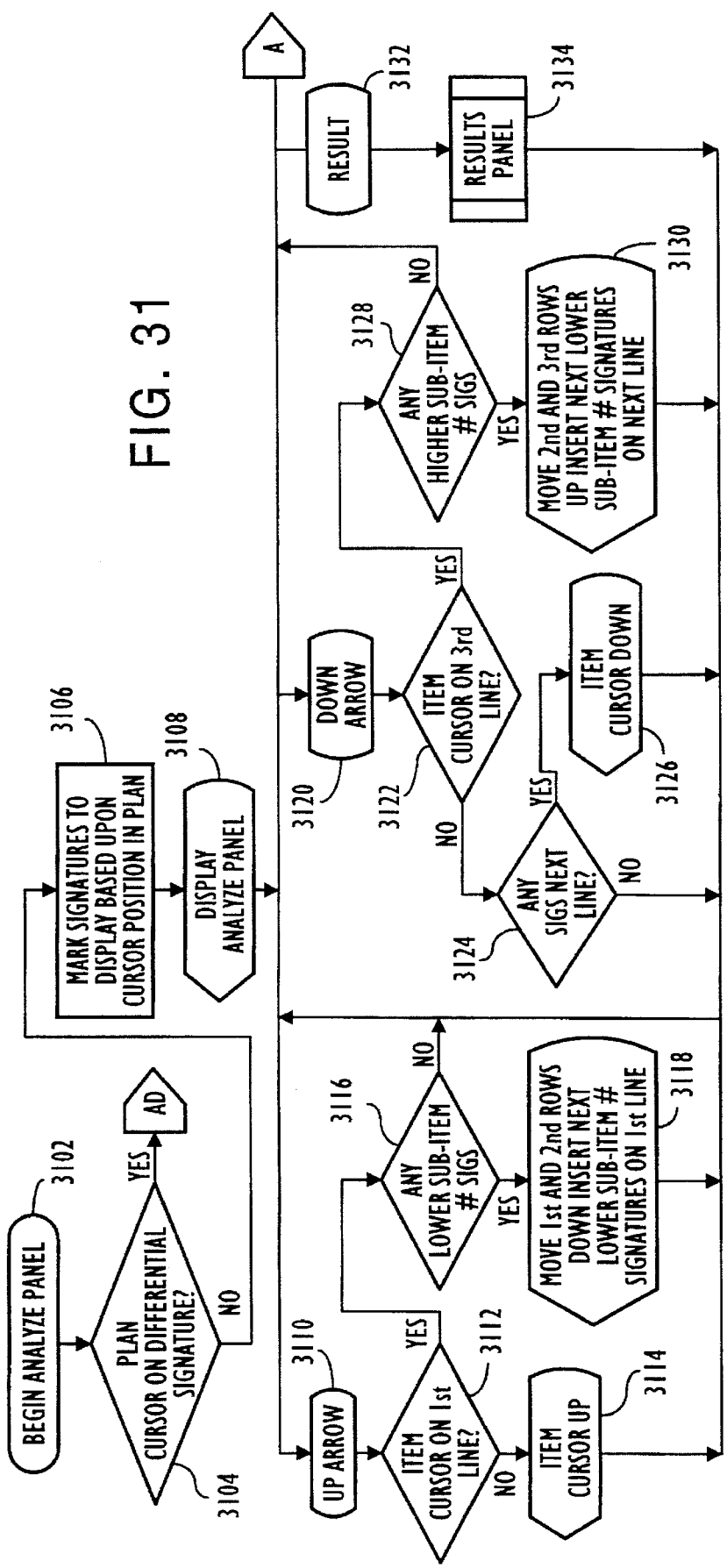
FIGS. 31–33 show a flow chart of the operation of the ANALYZE PANEL.

The operation of the ANALYZE PANEL will be described with reference to FIGS. 31–33. When this panel is called (step 3102), it is determined whether the cursor is on a differential signature (step 3104). If so, the procedure of FIG. 33 will be followed, as explained below. If not, the signatures to display are marked based upon the cursor position in the plan (step 3106), and the ANALYZE PANEL is displayed (step 3108). The user can select items with the up arrow (steps 3110–3118) or with the down arrow (steps 3120–3130) or may go to the Results panel (steps 3132 and 3134). The up arrow is used thus. When the user hits the up arrow in step 3110, the apparatus determines in step 3112 whether the item cursor is on the first line. If not, the item cursor is moved up in step 3114. If the item cursor is on the first line, the apparatus determines in step 3116 whether there are any lower sub-item number signatures. If so, in step 3118, the apparatus moves the first and second rows down and inserts the next lower sub-item number signatures on the first line. The down arrow is used in a similar manner. When the user hits the down arrow in step 3120, the apparatus determines in step 3122 whether the item cursor is on the third line. If not, the apparatus determines in step 3124 whether there are any signatures on the next line. If so, the item cursor is moved down in step 3126. If the item cursor is on the third line, the apparatus checks in step 3128 whether there are any higher sub-item number signatures; if so, in step 3130, the apparatus moves the second and third rows up and inserts the next higher sub-item number signatures on the next line.

Figure 32:
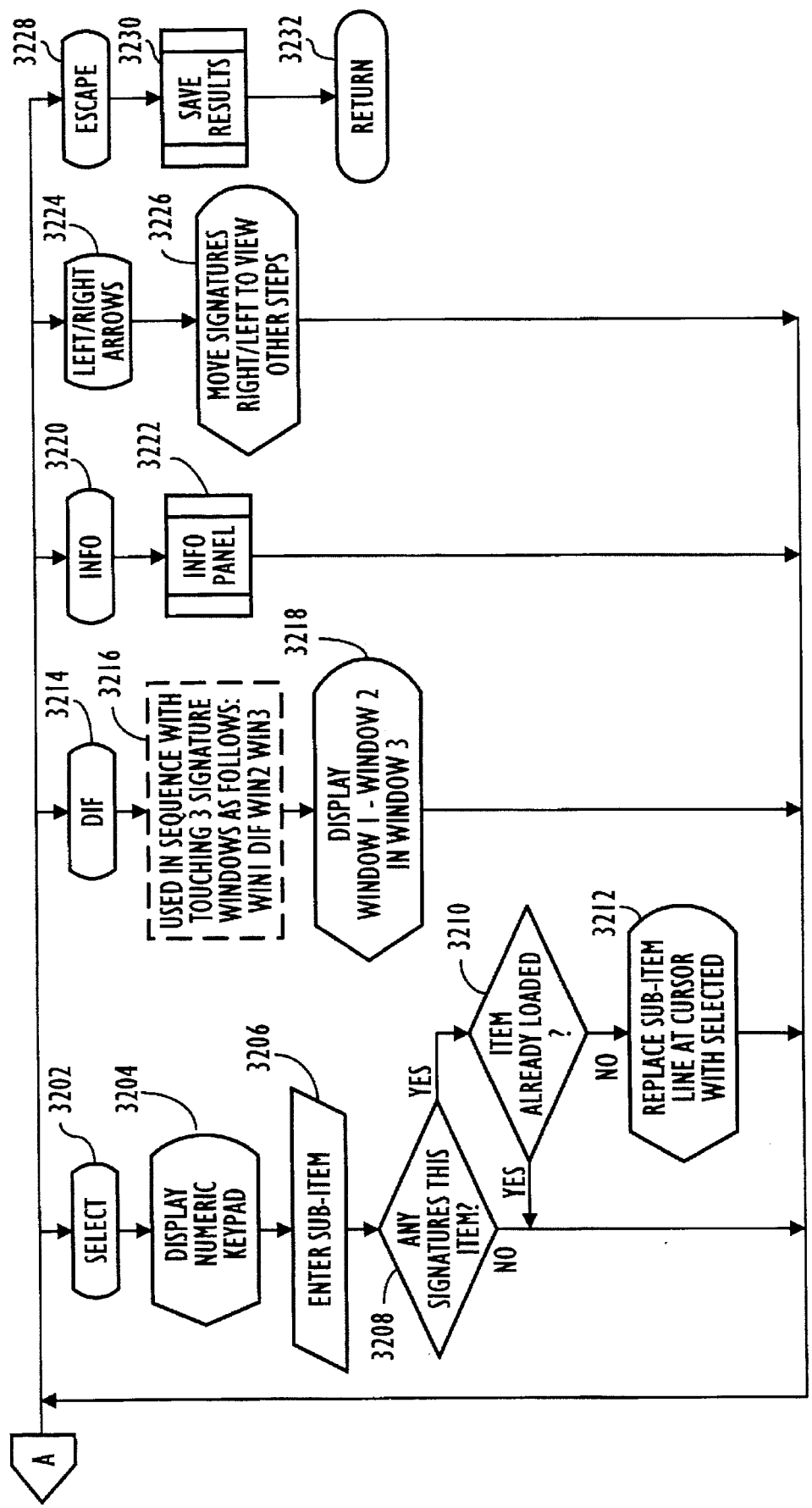
Figure 33:
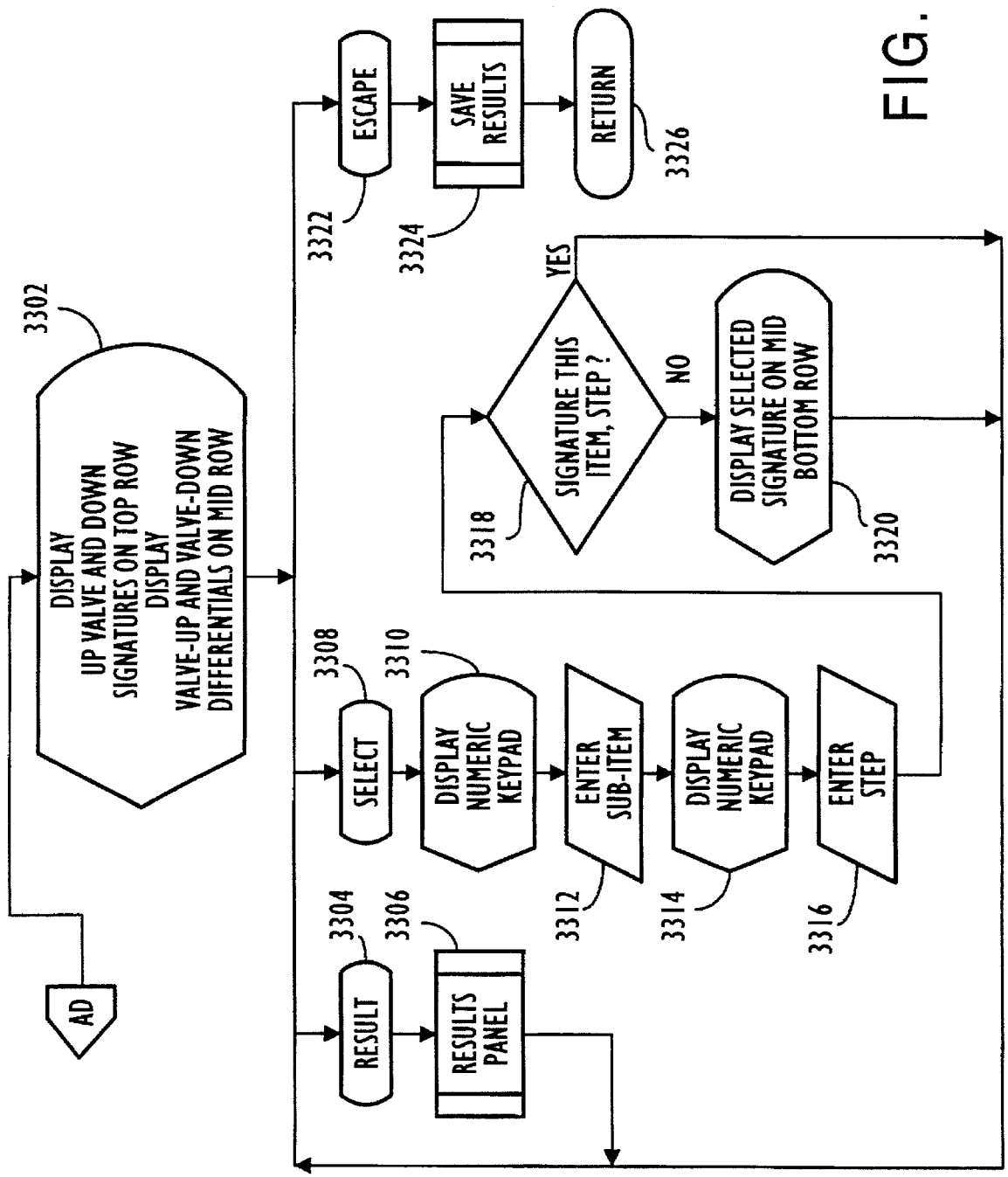

In FIG. 32, when the SELECT button is pressed (step 3202), the numeric keypad is displayed in step 3204, and the user can select a sub-item by entering the sub into the numeric keypad in step 3206. The apparatus checks in step 3208 to see whether there are any signatures in this item. If so, it checks in step 3210 to see whether the item is already loaded. If not, in step 3212, the apparatus replaces the sub-item line at the cursor with that selected. With the DIF key, selected in step 3214 and used in conjucntion with the selection of three signature windows in stpe 3216, the user may display the difference between any two signature windows in a third window in step 3218. The INFO key calls the INFO PANEL (steps 3220 and 3222). The left and right arrows, selected in step 3224 move signatures left and right to view other steps in step 3226. The ESC key saves results and returns to the control panel (steps 3228–3232).

The operation of the ANALYZE PANEL in the case of a differential signature will be explained with reference to FIG. 33. In this case, the upstream, valve, and downstream signatures are displayed on the top row, while the valve-upstream and valve-downstream differentials are displayed on the mid row (step 3302). Then, the user can go to the CONCLUDE PANEL (steps 3304 and 3306) or select a sub-item and a step with the numeric keypad by hitting the "Select" button in step 3308, whereupon the apparatus displays the numeric keypad in step 3310. The user enters the sub-item in step 3312, the apparatus displays the numeric keypad again in step 3314, and the user enters the step in step 3316. In step 3318, the apparatus determines whether there is a signature for this item and this step; if not, the selected signatures are displayed on the bottom row (step 3320). The user can also escape by hitting the "Escape" button in step 3322, whereupon the apparatus saves the results in step 3324 and returns to the CONTROL PANEL in step 3326.

SIGNATURE COMPARISON TECHNIQUES

The software performs valve leakage analysis by signature comparison. Valve leakage analysis is usually a complex issue. Three factors must be resolved. First, leakage noise has a significant but predictable coupling between valves in a system. Second, multiple leak sources must be identified. Third, external background noise sources (e.g., pumps, condensers) can mask leak noise. Therefore, there are times when changing valve openings/closings are not sufficient or possible to positively identify leak sources and sizes. In these cases, the following differential methods are used.

The differential methods automate the general method of signature comparison where two signatures are subtracted in one display to give better visual resolution of amplitude comparison and eliminate the human errors of the previous manual processes. The operator analysis and also the automatic analysis then take into account the noise coupling function as follows. Noise is attenuated as it travels down a pipe from one valve to the next. This coupling is a function of frequency with attenuation at a frequency given in dB per length as measured in units of pipe diameters. The attenuation increases approximately in function of the square root of frequency. For example, the attenuation between two valves ten pipe diameters apart might be 10 dB at 120 kHz but only 1 dB difference at 20 kHz. Thus, an analysis should place more weight on the observed difference at the higher frequencies.

The following three differential methods start with the most general and move to the more complicated and specific.

(1) Signature Comparison Method

Any plan has the option of displaying the difference between two signatures in the Analyze Panel. Heretofore these signatures were recorded on different sheets of paper for visual analysis by the operator, and the difference was neither calculated nor displayed. Certain simple plans have an automatic addition of difference displays; in the case of only a few valves, the plans store information indicating which signatures are to be used. In addition, the DIF key can manually display the difference between any two signatures already showing on the Analyze Panel: Difference=Sig1−Sig2. The user touches the first signature, then the second signature, then the Dif Key, and finally, the location to place the difference display. This method produces an exact difference between signatures at different valves and/or different steps.

Certain standard plans have an automatic setup to display several difference signatures. For example, the simplest is Plan 1. It displays pressure-background both across the valves and across the steps. An operator can quickly judge the results upon entering the Analyze Panel.

(2) One Transducer Differential Signature

Differential signatures are used where it is not possible to remove pressure from a valve to obtain a background comparison signature. This method employs a single transducer and takes three separate signatures to compare a valve with background noise on either side of it. It assumes that the signatures are stationary over the time of collection. The three signatures are sequentially taken on the valve, upstream of it and downstream of it. Up and Down can be on another valve or just the pipe. Although a greater separation of up, valve and down locations is desired, useful comparisons can be made just off the valve onto the pipe.

This set of three signatures is marked by one Xd in a plan which then brings up three extra keys above the plan. After collecting the signatures, the user hits Analysis with the plan cursor on the Xd. A dedicated Analysis Panel will come up showing the three signatures on the top line and two difference displays, Valve-Up and Valve-Down, on the middle line. The system will then automatically produce a recommended result indicating whether or not there is a leak by performing one of the analysis procedures described below.

(3) Two Transducer Differential Method

In certain cases where the valve condition cannot be changed and background conditions are unstable, signatures must be taken simultaneously at two locations selected from the valve and at up and down locations relative to the valve. This method prevents false readings due to a change in conditions between signatures. Three transducers would be difficult to manage simultaneously, but only two at a time are required to produce valid signatures.

When the cursor is on an Xd in the Signature Panel, the user hits Mode to change to two channel collection. Two keys will appear instead of three above the Plan with the V-U key highlighted. The user places the channel A transducer at the valve location and the channel B transducer at the Up location and hits Go. After saving this, the highlighted key will automatically switch to V-D. The user repeats the Go with the channel B transducer placed at the down location and saves this. The repeatability is complicated in this method due to the necessity to reseat both transducers properly.

The V-V key is an option key used to acquire a differential signature with both transducers located on the valve. If taken, the V-V signature is used to apply a transducer sensitivity correction function to the channel B part of the differential signatures in the display and automatic analysis as follows:

| | |
|---|---|
| $C_{vv}(f) = S2_{vv}(f)/S1_{vv}(f)$ | both transducers on Valve |
| $C2'(f) = S2(f) * C_{vv}(f)$ | applied to channel B at Up and Down |

Analyze Panel display and automatic analysis proceeds almost the same as in the one transducer method above, except both valve signatures (from V-U and V-D) appear on the top line, the up and down signatures appear on the middle line, and the difference signatures on the bottom line.

AUTOMATIC PROCEDURES FOR ANALYSIS OF SIGNATURES

Automatic analysis, by which the invention automates a process which was previously performed manually, will now be described with reference to examples which are meant to be illustrative rather than limiting. For instance, the equations used are examples and specific numeral citations can be used to fit the situation at hand.

The most important factor in proper application of automatic analysis is the selection of signatures upon which to base recommendations. One assumption is that the plan has been properly designed to represent all the valves affecting pressures and leak noise contribution. Another is that the proper valve alignment has been established to produce pressure and no pressure conditions called for in the signature type. The next most important factor is the amplitude criteria used to quantify leakage. Another optional factor is the frequency weighting function applied to each signature as it is fed into the amplitude criteria calculations. Usually, the weighting function emphasizes the higher frequencies, i.e., $W(f)=\sqrt{2*f/Range}$ (unity mid range). This is due both to lower transducer sensitivity with increasing frequency and to the acoustic attenuation with frequency de-emphasizing background noise. An operator selected semi-automatic method described below adds a band select limiting to the weighting, i.e., $W(f)=0$ below $f_b-0.05*Range$ and above $f_b+0.05*Range$.

In operator-selected two-signature analysis, each time the operator uses the Dif key in the Analyze Panel, a ratio R is calculated of the two signatures chosen. The total band Differential Signature Entry Analysis (r, ASAmax and result where ASA=acoustic signature amplitude, which is the sum of attenuation and relative amplitude) is displayed in the upper right corner of that difference display. This display is automated; previous processes required that the operator record attenuation and calculate the ASA. The Band key and then any peak on the difference display are hit to replace the analysis with a band limited analysis at the dominant frequency chosen.

One main advantage of organizing valves into standard plans is to apply proven standardized analysis methods to them. As the methods are proved, they can be added to specific plans by the program. They could include any number of different comparisons as described above. The method of ratio calculation is individually selectable for each comparison, and the frequency weighting function can be applied or ignored for each. Then the result dependency for each item is selected as the maximum/minimum of one or more of the comparisons and the limit criteria are modified if necessary.

This analysis technique preprogrammed into the plan can still be temporarily overridden in the Analysis Panel by the use of the Band key calculating a dominant frequency ratio. Differential signature entry analysis is a specific preset example of the above and uses point-by-point ratio criteria (explained below) to calculate R for both Valve-Up and Valve-Down. The lower of these and the Valve ASAmax are taken to apply to Absolute Result Specification.

When a group of parallel valves under matched conditions cannot be operated, a direct comparison analysis can be done to calculate relative leak rates among the group. The most dominant frequency is selected over the group. The ratio of each signature amplitude to the sum of all the signature amplitudes at the dominant frequency is the proportionate leak rate.

Three kinds of ratio criteria will now be explained. The signatures to be used can be selected manually or automatically as needed. For example, if adjacent signatures in a row or column are valve and background signatures, they can be automatically selected. In single-frequency ratio criteria, at an operation-selected frequency f, the ratio is calculated as:

$$R=S1(f)/S2(f)$$

The dominant frequency is selected automatically at the highest peak of a frequency weighted signature. If the highest peak is found at the lowest frequency, the next highest is selected. Manual selection with the Band key can be anywhere; however, it is again automatically maximized within 8% of the frequency touched. At the selected frequency, the ratio is $$R=S1(f)/S2(f)$$

In RMS ratio criteria, the ratio of RMS is calculated thus:

$$S_{RMS1} = \sqrt{\Sigma(S1(f) * W(f))^2 / \Sigma W(f)}$$

$$S_{RMS2} = \sqrt{\Sigma(S2(f) * W(f))^2 / \Sigma W(f)}$$

$$R = S_{RMS1}/S_{RMS2}$$

In point-by-point ratio criteria, the RMS of the ratio function is calculated thus:

$$C(f) = (S1(f) - S2(f))/(S1(f) + S2(f))$$

$$R = \Sigma(C(f) * A(f))/\Sigma A(f)$$

$$V = \sqrt{(\Sigma(C(f)^2 * A(f)) - (\Sigma(C(f) * A(f)))^2/\Sigma A(f))/\Sigma A(f)}, \text{ where}$$

R is the weighted signature difference ratio ($-1<R<1$);

V is the variance of the weighted signature difference;

S1(f) is the magnitude function of frequency and $\Sigma$ is a sum over the 10% to 100% frequency range for each f where S1(f) or S2(f)>12 dB ASA; and A (f) is a second weighting function to discount lower amplitude frequencies and to take into account the sound attenuation (which is a function of frequency and distance) of a linear system:

$$A(f) = 1 \quad (S1(f)+S2(f))+(S1max+S2max) > .1,$$
$$= 10 * (S1(f)+S2(f))/(S1max+S2max) \quad \text{otherwise.}$$

This approach bypasses the W(f) function.

The ratio, once calculated, may be used to determine the existence and severity of a leak thus:

Large leak: R>25 dB
Medium leak: 25 dB>R$\geq$10 dB
Small leak: 10 dB>R$\geq$0 dB
Tight: R<0 dB Absolute result specification uses R and V thus:
Tight: R<0,V<0.2
Leak: R>0.3, V<0.2
Otherwise, operator judgment is required. If a leak is found, the size of the leak is given automatically from the maximum ASA of the smoothed valve signature:
Large: ASAmax≧55 dB
Medium: 55 db>ASAmax≧35 dB
Small: ASAmax<35 dB For steam traps, a time survey analysis is required. The system takes a time sweep signature of average amplitude over a 10% bandwidth centered at a selected frequency. The frequency can be selected when the operator hits BW. A standard frequency spectrum appears by itself. The user touches a peak on the signature, and that frequency is selected. When Go is hit, a time signature records average amplitude for either 30, 60, or 120 seconds (set by Avg on Control Panel).

Automatic analysis first identifies open and closed states on the pressure time signature. Maximum amplitude (Amax) is calculated as the average of the highest 5% of points and minimum amplitude (Amin) is the average of the lowest 10% of points. If the ratio Amax/Amin is less than 5 dB, it is called stuck shut. If a background (no pressure time or frequency signature) is completed on the trap, it can be further classified. The average amplitude of the pressure (Pav) and background (Bav) signatures and the ratio of Dav/Bav are calculated. If the ratio is greater than 20 dB, it is called stuck open. If the ratio is less than 5 dB, it is called stuck shut.

If the trap is not stuck shut, any point above (Amax+Amin)/2 is called open while points below are shut. The result is classified as:

| | |
|---|---|
| Failed | Amin/Bav > 3 dB |
| | or length of all Open periods < 5 sec |
| | or time between start of Open periods > 15 |
| Satisfactory | otherwise |

Any time the Analyze Panel calculates a recommended result, it is displayed automatically in the CONCLUDE PANEL but marked as recommended (flashing). When the user touches a recommended result in the CONCLUDE PANEL, it becomes an accepted result which could be changed manually by touching it again. If not accepted before returning to the CONTROL PANEL, all recommended results are lost.

Figure 34:
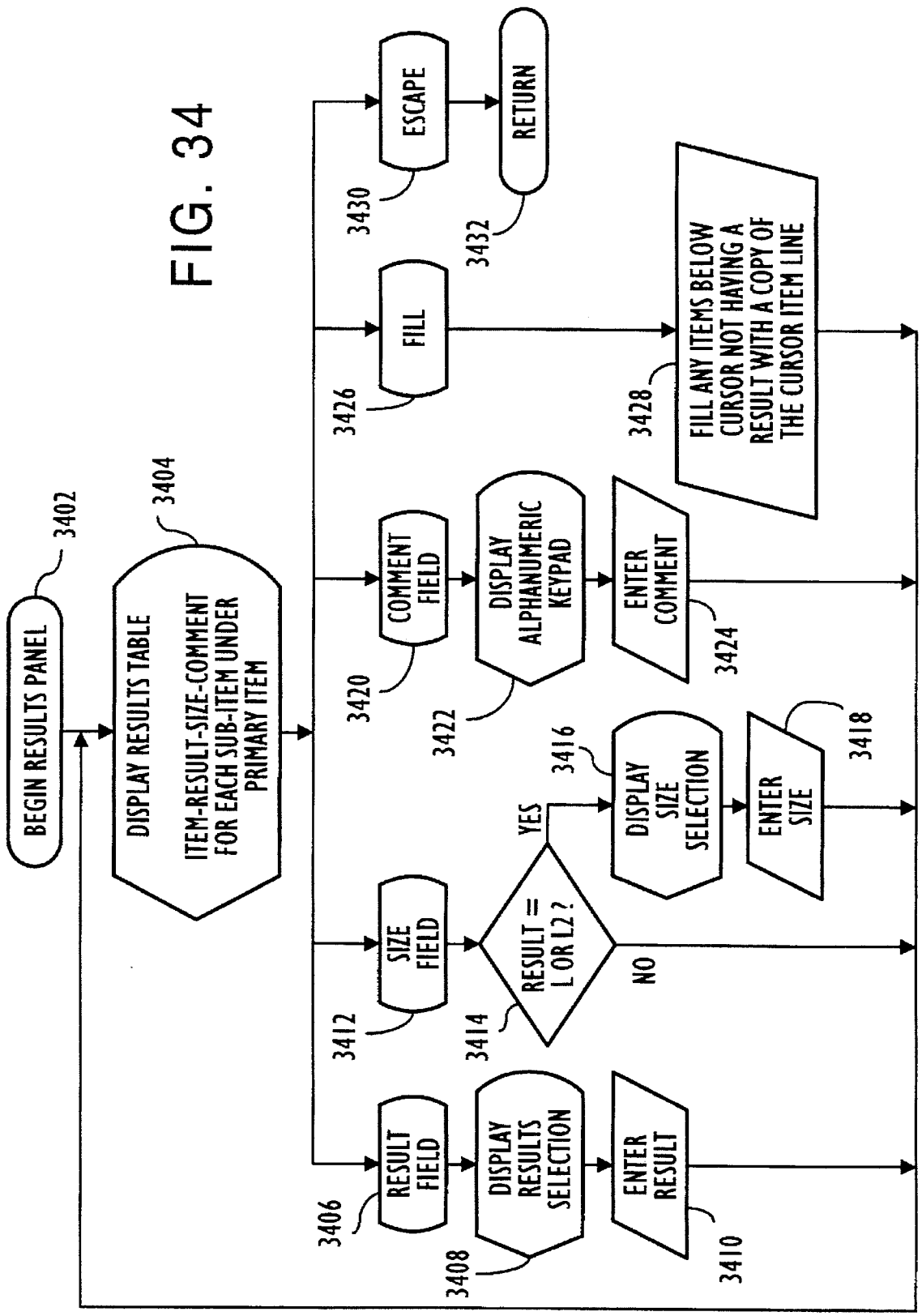
FIG. 34 shows a flow chaff of the operation of the CONCLUDE PANEL.

The operation of the CONCLUDE PANEL will be explained with reference to FIG. 34. Essentially, machine-recommend results are displayed which can be accepted or rejected by the user in formulating his conclusion. When this panel is called (step 3402), the results table is displayed (step 3404), with the item, result, size, and comment for each item under the primary item. The user may enter a conclusion, namely, whether a leak is judged to exist by hitting the "Results Field" button in step 3406, whereupon the apparatus displays the results selection in step 3408, and the user can enter a result in step 3410. The user can also enter an estimated size of the leak by hitting the "Size Field" button in step 3412, whereupon the apparatus determines in step 3414 whether the result is L or L2. If so, the apparatus displays the size selection in step 3416, and the user can enter the size in step 3418. To enter a comment, the user hits the "Comment Field" button in step 3420, whereupon the apparatus displays the alphanumeric keypad in step 3422, and the user can enter a comment in step 3424. By hitting the "Fill" button in step 3426, the user may also fill any items below the cursor not having a result with a copy of the cursor item line (step 3428) or escape to the control panel (steps 3430 and 3432).

A useful feature of this invention is the use of multiple prompting levels. Signature collection for leakage requires a complex plan procedure with as much information collected as possible. Only after much experience can an operator recognize unnecessary steps in specific circumstances. Schedule pressures usually dictate maximum testing speed. Therefore, the system has two types of process prompting two user selectable levels. Some are displayed at either level and others only at full prompt level. They help to expedite and minimize training required.

The system remains at the process prompting level set until reset by the following method. The user quits from the Control Panel to go to DOS and restarts the system adding the appropriate argument as follows:

| | |
|---|---|
| AVLA/b | for Full prompt Level |
| AVLA/e | for Experienced Level |

The first type of prompting is the status messages displayed on the left above the piping diagram. Most of these show at both levels. Instructions for signature collection follow this order:

Place Transducer on Item 5.1    hit Go
CHECK: Reseat Transducer on Valve 5.1 and hit GO
Good Repeatability hit Save
Plan Completed
Other messages include:
    Not Settled Retake
    Not A Signature Step
    No Data Acquired The full prompt level adds some other messages
Step 1 alignment not completed
The second type of prompting uses the YES/NO window to ask a question and receive a response. Although it is used widely through the panels to help prevent making a mistake and losing data, this description mainly details its use in signature collection at full prompt level. Valves are grouped under a primary item with a plan testing structure. A plan will provide a signature entry for every combination of valve pressures (open/closed) necessary to resolve any possible source of leakage.

An inexperienced operator needs to follow a fixed procedure of valve opening/closing and signature collection. Actually, the most important reason is to observe plant safety and prevent open flow paths. The system aids this by leading the operator through each detail of the process of valve alignment, telling the user which valves to open and close and which signatures to take in each step, in addition to the above-described signature collection messages. Upon starting and after each step in the plan is completed, a sequence of questions show in the YES/NO window as in the following example:
Close Item 5.1–READY?
Open Item 5.0–READY?
Open Item 5.2–READY?
Note that proper plan design (not overriding the automatic entry placement in the MAKE panel) will place valve closings in a non-signature step preceding valve openings, thus automating the valve alignment process and signature entries. The system will automatically move the plan cursor, ask the valve openings/closings and request necessary signature collection. Advancement through the plan is first up/down and then left to right. If the operator bypasses a signature, the system tries to return to it before advancing to the next Step. If the operator tries to move to a different Step with the arrow keys, a YES/NO question requests confirmation:

Step NOT completed, are you sure?

The system remembers when the user performs actions out of the predetermined order and prompts the user to perform all necessary actions. Thus, even when the user varies the order, all necessary actions are performed; otherwise, some might be skipped.

A related feature, and one of particular interest to inexperienced users, is the help function. If the user is not sure how to use any particular key, he can hold down the key for at least one second to receive a descriptive, context-sensitive help message. If he presses and releases the key within one second, the key performs its normal function. Of course, other actuations could be used, such as the use of a right mouse button for the help message and a left mouse button for normal operation. Alternatively, a help key, analogous to the F1 key used in many standard applications, can be provided. Battery life indication and a brightness control for the display can be built into the help feature.

Figure 35:
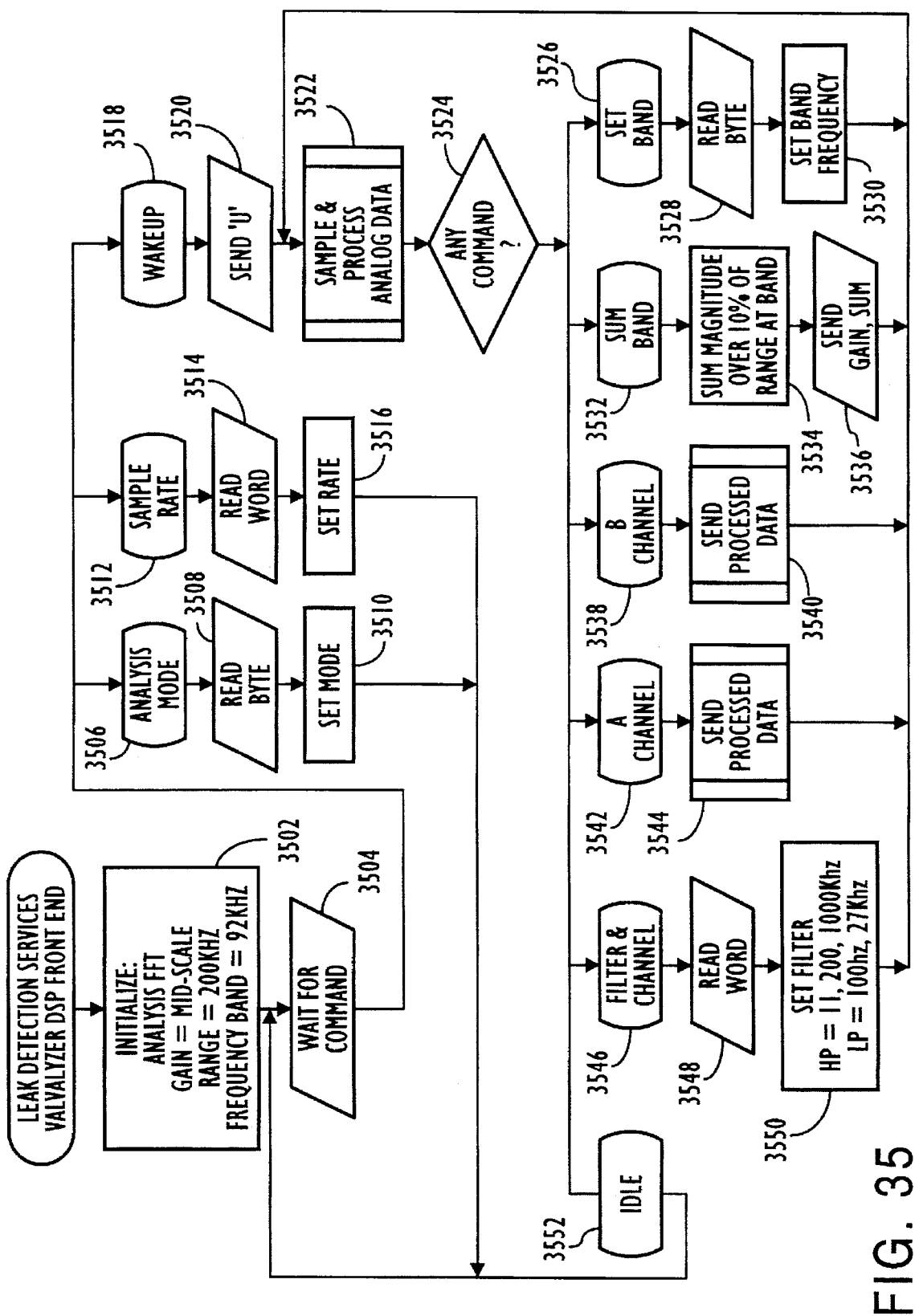
FIGS. 35–37 show a flow chart of the operation of a digital signal processor used in the invention.
Figure 36:
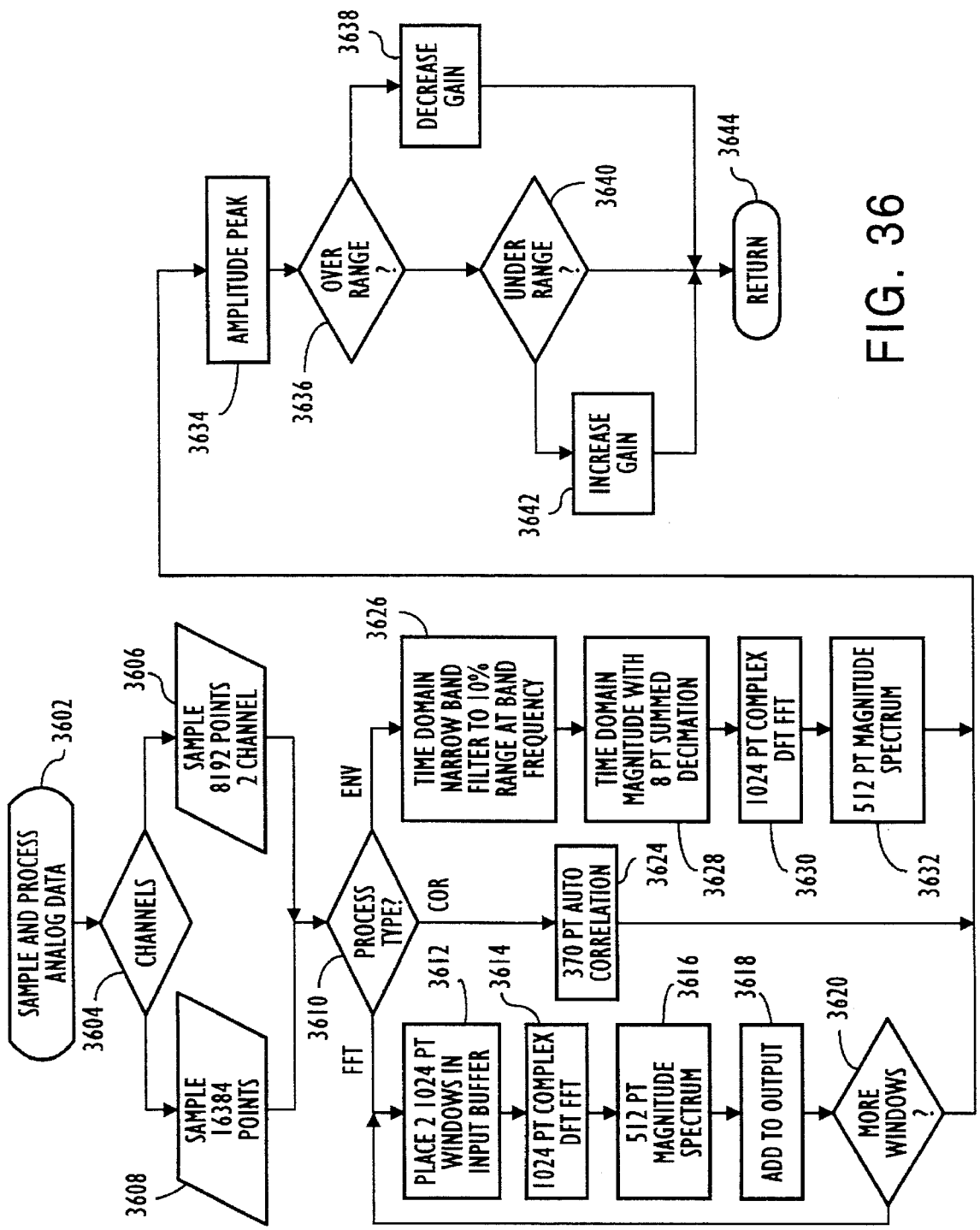
Figure 37:
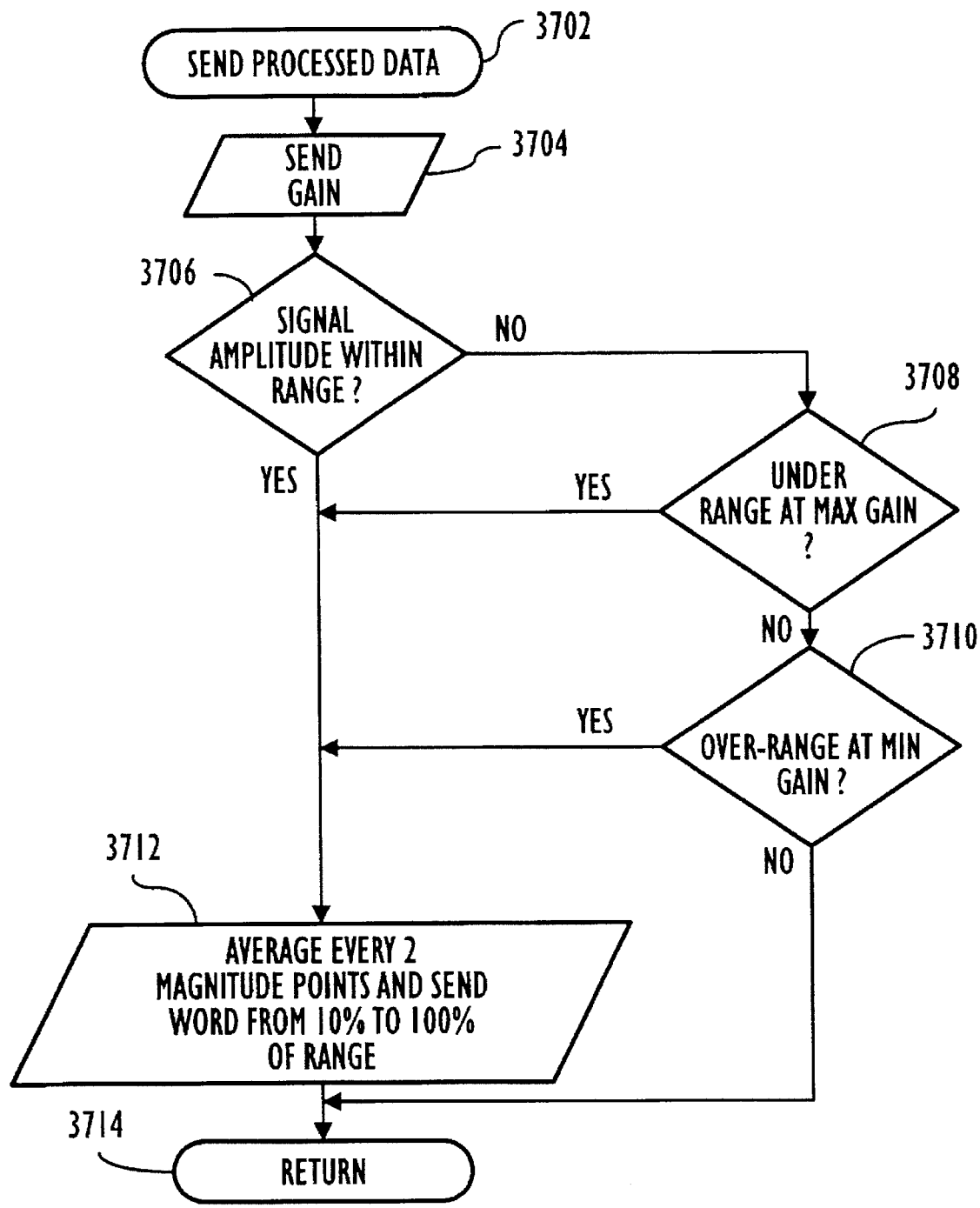

Finally, the operation of digital signal processing performed in FFT module 106 will be explained with reference to FIGS. 35–37.

When the FFT module is initialized, the following defaults are set (step 3502): analysis=FFT, gain=mid-scale, range=200 kHz, and frequency band=92 kHz. Then a user command is awaited (step 3504).

At this stage, the user can reset the analysis mode (by selecting "Analysis Mode" in step 3506, whereupon the apparatus reads a byte in step 3508 and sets the mode in step 3510) or the sample rate (by selecting "Sample Rate" in step 3512, whereupon the apparatus reads a word in step 3514 and sets the rate in step 3516) or issue a wakeup command (step 3518). In the case of the last option, "U" is sent (step 3520), and the FFT module samples and processes analog data (step 3522, to be explained below with reference to FIG. 36) and awaits any command (step 3524). Now the user can set the band (steps 3526–3530), sum over the band (steps 3532–3536), have processed data sent from the A channel (steps 3542 and 3544) or the B channel (steps 3538 and 3540), set the filter and channel (steps 3546–3550), or put the module into idle mode.

The step of sampling and processing analog data will be explained with reference to FIG. 36. When this step is called (step 3602), in accordance with the number of channels set (step 3604), the module samples either 16,384 points over one channel (step 3608) or 8,192 points over two channels (step 3606). Then, in accordance with the process type selected (step 3610), the module performs a FFT (steps 3612-3620), an autocorrelation (step 3624), or an envelope calculation (steps 3626–3632). Each of these operations is performed in the following manner. When the process type is FFT, the apparatus places two 1,024-point windows in the input buffer in step 3612, performs a 1,024-point complex DFT FFT in step 3614, derives a 512-point magnitude spectrum in step 3616, adds to the output in step 3618, and determines in step 3620 whether there are more windows on which to perform the foregoing operations. When the process type is autocorrelation, the apparatus performs a 370-point autocorrelation in step 3624. When the process type is envelope calculation, the apparatus sets the time domain narrow-band filter to a 10% range at the band frequency in step 3626, determines a time domain magnitude with eight-point summed decimation in step 3628, performs a 1,024-point complex DFT FFT in step 3630, and derives a 512-point magnitude spectrum in step 3632. The apparatus then takes the amplitude peak range in step 3640. In accordance with the results of steps 3636 and 3640, the gain is automatically decreased (step 3638) or increased (step 3642) as required, is over rante in stpe 3636 or under and the original process is returned to (step 3644). Previous processes required manual judgment and recording of the proper gain.

The step of sending the processed data, as in steps 3540 and 3544 of the operation of the FFT module, will be explained with reference to FIG. 37. When this operation is called (step 3702), the gain is sent (step 3704), and it is determined whether the signal amplitude is within range (step 3706). If so, every two magnitude points are averaged, and data from 10% to 100% of the range are sent (step 3712). If not, it is determined whether the signal amplitude is under range at the maximum gain (step 3708) or over range at the minimum gain (step 3710). If either of these conditions is met, step 3712 is executed. If not, step 3712 is not executed. The original process is returned to (step 3714).

The above description is meant to be illustrative rather than limiting. Those skilled in the art who have reviewed this specification will understand that other embodiments may be made that fall within the scope of the invention. For example, the apparatus may be equipped with a bar-code reader for use in plants that have bar-coded valves. Also, a color screen can be used to superimpose signatures. Instead of fast Fourier transforms, other transforms may be used, such as time domain transforms, correlation, convolution, and band-limited time correlation. Instead of software, firmware or the like could be used to guide the user and to perform analysis. Those skilled in the art who have reviewed this specification will readily understand how to make the modifications appropriate for their purposes without departing from this invention.

What is claimed is:

1. An apparatus for performing a process of testing a valve system for a valve leak, the apparatus comprising:
   transducer means for receiving sounds from the valve system and for converting the sounds into electrical signals;
   transform means for receiving the electrical signals, for computing a transform of the electrical signals to produce at least two sound signatures, and for outputting digital data representing the at least two sound signatures; and
   computation means for (i) receiving said digital data and comparing said at least two sound signatures to obtain a comparison result, and (ii) automatically deriving a recommended result regarding whether said valve leak exists from the comparison result.

2. An apparatus as in claim 1, wherein the comparison result is a ratio of amplitudes of said at least two of the sound signatures at a selected frequency which is taken from the group consisting of a manually selected frequency and an automatically selected frequency.

3. An apparatus as in claim 1, wherein the comparison result is a ratio of root mean squares of weighted amplitudes of said at least two of the sound signatures, the root mean squares being calculated over a predetermined frequency range.

4. An apparatus as in claim 1, wherein the comparison result is a root mean square, over a predetermined frequency range, of weighted ratios of amplitudes of said at least two of the sound signatures.

5. An apparatus as in claim 1, wherein:
amplitudes of the sound signatures at a dominant frequency are summed to derive a sum; and
the comparison result for each valve is a ratio of an amplitude of that valve's sound signature at the dominant frequency to the sum.

6. An apparatus as in claim 1, further comprising digital storage means for storing the digital data representing the sound signatures and a conclusion derived from the recommended result and said at least two sound signatures.

7. An apparatus as in claim 1, further comprising display means for displaying said at least two sound signatures and said recommended result.

8. An apparatus as in claim 1, wherein the display means also displays a difference calculated from said at least two sound signatures.

9. An apparatus as in claim 1, further comprising digital storage means for storing an information database and a group of test structures for said process of testing.

10. An apparatus as in claim 1, further comprising connection means for outputting the digital data representing the sound signatures and the conclusion to an external computer.

11. An apparatus as in claim 10 wherein the connection means comprises a port for a floppy drive.

12. An apparatus as in claim 1, wherein the computation means comprises an interface means for receiving a user's input for at least one of planning, testing, analysis and reporting of a test survey.

13. An apparatus as in claim 12, wherein the interface means comprises a touch screen.

14. An apparatus as in claim 12, wherein said computation means comprises control and display means for guiding the user in understanding the process of testing.

15. An apparatus as in claim 14, further comprising digital storage means for storing a plurality of instructions for operation of the computation means.

16. An apparatus as in claim 15, wherein the transform means comprises storage means for storing a plurality instructions for operation of the transform means.

17. An apparatus as in claim 14, wherein the computation means comprises selection means for controlling the interface means to enable the user to make choices required for the process of testing.

18. An apparatus as in claim 17, wherein the selection means further controls the apparatus to collect the sound signatures in accordance with the choices made by the user.

19. An apparatus as in claim 17, wherein, when the interface means displays one or more of the sound signatures simultaneously and the user uses the interface means to indicate a portion of one of the one or more of the sound signatures, the interface means generates a touch signal and outputs the touch signal to the control means, which changes a scaling factor by which the one or more sound signatures are displayed on the interface means in accordance with the touch signal.

20. An apparatus as in claim 17, wherein the interface means has a plurality of manners of actuation by the user, and wherein the interface means comprises help means for displaying, when the user performs a predetermined one of the plurality of manners of actuation, a context-sensitive descriptive message.

21. An apparatus as in claim 17, wherein the selection means enables the user to select a parameter and controls the transducer means and the transform means so that the sound signatures are produced in accordance with the parameter selected by the user.

22. An apparatus as in claim 21, wherein the parameter is frequency range.

23. An apparatus as in claim 21, wherein the parameter is bandwidth.

24. An apparatus as in claim 21, wherein the parameter is transform type.

25. An apparatus as in claim 21, wherein the parameter is averaging type.

26. A method for testing a valve system for valve leaks, the method comprising:
(a) positioning at least one transducer on the valve system to receive two different sounds from a valve in the valve system and to convert the sounds into electrical signals;
(b) transforming the electrical signals to produce sound signatures and outputting digital data representing the sound signatures;
(c) comparing at least two of the sound signatures, based on said digital data, to obtain a comparison result; and
(d) deriving a recommended result regarding valve integrity from the comparison result and displaying the recommended result to a user.

27. A method as in claim 26, wherein the comparison result is a ratio of amplitudes of said at least two of the sound signatures at a selected frequency which is taken from the group consisting of a manually selected frequency and an automatically selected frequency.

28. A method as in claim 26, wherein the comparison result is a ratio of root mean squares of weighted amplitudes of said at least two of the sound signatures, the root mean squares being calculated over a predetermined frequency range.

29. A method as in claim 26, wherein the comparison result is a root mean square, over a predetermined frequency range, of weighted ratios of amplitudes of said at least two of the sound signatures.

30. A method as in claim 26, wherein:
amplitudes of the sound signatures at a dominant frequency are summed to derive a sum; and
the comparison result for each valve is a ratio of an amplitude of that valve's sound signature at the dominant frequency to the sum.

31. A method as in claim 26, further comprising storing the digital data representing the sound signatures and a conclusion derived from the sound signatures and the recommended result in a digital storage medium.

32. A method as in claim 26, wherein step (d) comprises correcting the sound signatures for sound attenuation, said sound attenuation being a function of frequency and distance.

33. A method as in claim 26, wherein step (a) includes positioning the transducer at a plurality of positions on the valve system, or positioning the at least one transducer in one or a plurality of positions on the valve system and controlling the valve system to provide a plurality of differential pressures across the valve system.

34. A method as in claim 26, further comprising (e) outputting the digital data representing the sound signatures and the conclusion to an external computer.

35. A method as in claim 34, wherein step (e) comprises writing the digital data representing the sound signatures and the conclusion onto a machine readable medium.

36. A method as in claim 26, wherein
step (a) comprises automatically prompting the user (i) to ensure that predetermined valves in the valve system are open or closed, (ii) to indicate that the predetermined valves have been opened or closed as prompted, (iii) to attach the transducers to predetermined locations on the valve system, and (iv) to indicate that the transducers have been attached to the predetermined locations;

the sounds are not received until the user has indicated in step (a) that the predetermined valves have been opened or closed as prompted and that the transducers have been attached to the predetermined locations;

the user is automatically prompted to perform steps (a) and (b) a plurality of times for a plurality of configurations of opened and closed valves in accordance with a sequence stored in the automated interface device;

step (b) comprises fast Fourier transforming the electrical signals to produce the sound signatures and displaying the sound signatures to the user; and step (c) comprises automatically calculating a ratio of said at least two of the signatures and automatically determining, in accordance with a stored rule, the comparison result in accordance with the ratio; and step (c) further comprises prompting the user to input the conclusion on the basis of the sound signatures displayed in step (c) and the recommended result.

37. A method as in claim 36, wherein step (c) comprises receiving a user input indicating which of the sound signatures are to be compared and deriving the ratio from the sound signatures selected by the user.

38. A method as in claim 26, further comprising a step of storing an information database and a set of plans which are standard test structures or modified test structures derived from the standard test structures, said plans also including automated analysis structures.

39. A method as in claim 38, wherein step (e) comprises (i) compressing the digital data representing the information database, plans, sound signatures and conclusion into a compressed file and (ii) writing the compressed file onto a machine readable medium.

40. A method as in claim 38, wherein valves in the valve system are grouped into items and given item numbers, each of the item numbers are identified by a primary (group) number and a sub number, a primary (base) item having a system-specific function and all other items having a function supporting the primary item.

41. A method as in claim 40, wherein each set of items grouped under a primary item is assigned to one of said plans.

42. A method as in claim 41, wherein all items are compiled into an ordered database having information categories including items, plans and identification information.

43. A method as in claim 42, further comprising repeatedly searching the ordered database according to any of the information categories for selecting an order of group testing and separating results of such searching by test completion.

44. A method as in claim 38, further comprising a step of displaying instructions which guide the user to comprehend and conduct the method for testing.

45. A method as in claim 44, further comprising:
selecting a highest signature of two or three contiguous signatures;
marking the highest signature with a RMS difference repeatability test result; and
determining whether the RMS difference repeatability test result conforms to a predetermined repeatability criterion; and
wherein, if the RMS difference repeatability test result does not conform to the predetermined repeatability criterion, said step of displaying instructions comprises instructing the user to reseat the at least one transducer.

46. A method as in claim 44, further comprising:
(i) prompting the user to remove and reseat the transducers and to repeat signature collection; and
(ii) calculating a RMS difference repeatability for verification of proper transducer placement.

47. A method as in claim 44, wherein the step of displaying instructions comprises:
(i) prompting the user to secure the valve system in a proper configuration;
(ii) in a case of positive user response, proceeding with the method of testing; and
(iii) in a case of negative user response, displaying a warning message; thereby promoting user safety and precluding invalid signatures.

48. A method as in claim 47, further comprising prompting the user to perform an operation selected from the group consisting of:
(i) placing the transducers on a portion of the valve system for testing;
(ii) reseating the transducers;
(iii) saving a signature when the signature is determined to be good; and
(iv) correcting a situation which causes an invalid signature.

49. A method as in claim 44, further comprising directing the user into test and analysis completion of an item group in a proper order.

50. A method as in claim 49, further comprising permitting the user to advance to a position in the plan selected by the user while maintaining full test completion prompting.

51. A method as in claim 44, wherein step (c) comprises:
(i) displaying two or more signatures;
(ii) receiving a user input representing a selection of a first signature and a second signature from the two or more signatures displayed and a location; and
(iii) determining a difference between the first and second signatures at the location selected by the user; and
(iv) displaying the difference obtained in step (c)(iii).

52. A method as in claim 51, wherein step (c) further comprises determining the recommended result based on the difference and displaying the recommended result.

53. A method as in claim 52, further comprising temporarily storing one or more recommended results until the user accepts them or enters conclusions different from the recommended results.

54. A method as in claim 53, wherein step (c)(i) comprises automatically selecting pairs of signatures for display, comparison and result recommendation.

55. A method as in claim 44, further comprising a step of enabling the user to make choices required for the method of testing.

56. A method as in claim 55, wherein the sound signatures are collected in accordance with the choices made by the user.

57. A method as in claim 55, wherein, when one or more of the sound signatures are displayed simultaneously and the user indicates a portion of one of the one or more of the sound signatures, a scaling factor by which the one or more sound signatures are displayed is changed.

58. A method as in claim 55, further comprising a step of displaying, when the user makes one of the choices in a predetermined manner, a context-sensitive descriptive message.

59. A method as in claim 55, wherein the step of enabling comprises enabling the user to select a parameter, and wherein the sound signatures are produced in accordance with the parameter selected by the user.

60. A method as in claim 59, wherein the parameter is frequency range.

61. A method as in claim 59, wherein the parameter is bandwidth.

62. A method as in claim 59, wherein the parameter is transform type.

63. A method as in claim 59, wherein the parameter is averaging type.

64. A method as in claim 26, wherein the sound signatures comprise sound data for at least one frequency greater than or equal to 100 kHz.

65. An apparatus as in claim 1, wherein the at least two sound signatures comprise sound data for at least one frequency greater than or equal to 100 kHz.

* * * * *